US012778355B2

(12) United States Patent
Yao et al.

(10) Patent No.: US 12,778,355 B2
(45) Date of Patent: Nov. 3, 2026

(54) FOAM PUMP DISPENSER AND ITS FOAM PUMP ASSEMBLY

(71) Applicant: The Procter & Gamble Company, Cincinnati, OH (US)

(72) Inventors: Lu Yao, Beijing (CN); Yilin Hong, Beijing (CN); Changzhuang Yao, Beijing (CN)

(73) Assignee: The Procter & Gamble Company, Cincinnati, OH (US)

(*) Notice: Subject to any disclaimer, the term of this patent is extended or adjusted under 35 U.S.C. 154(b) by 99 days.

(21) Appl. No.: 18/975,712

(22) Filed: Dec. 10, 2024

(65) Prior Publication Data

US 2025/0194865 A1 Jun. 19, 2025

(30) Foreign Application Priority Data

Dec. 14, 2023 (WO) ................ PCT/CN2023/138748

(51) Int. Cl.

| | |
|---|---|
| ***A47K 5/14*** | (2006.01) |
| ***B05B 7/00*** | (2006.01) |
| ***B05B 11/10*** | (2023.01) |

(52) U.S. Cl.

CPC .............. *A47K 5/14* (2013.01); *B05B 7/0037* (2013.01); *B05B 11/1087* (2023.01); *B05B 11/109* (2023.01); *B05B 11/1059* (2023.01)

(58) Field of Classification Search

CPC ..... A47K 5/14; B05B 7/0037; B05B 11/1087; B05B 11/109

See application file for complete search history.

(56) References Cited

U.S. PATENT DOCUMENTS

| | | | | |
|---|---|---|---|---|
| 5,635,469 | A | 6/1997 | Fowler et al. | |
| 8,863,990 | B2 | 10/2014 | Kerr et al. | |
| 9,004,319 | B2 * | 4/2015 | Kim | B05B 11/1087 222/321.9 |
| 2022/0008943 | A1 | 1/2022 | Kimura | |
| 2023/0166277 | A1 | 6/2023 | Ma | |
| 2025/0345818 | A1 * | 11/2025 | Liang | B05B 11/1087 |

FOREIGN PATENT DOCUMENTS

| | | | | |
|---|---|---|---|---|
| CN | 207086160 U | | 3/2018 | |
| CN | 112173408 A | | 1/2021 | |
| CN | 112173409 A | | 1/2021 | |
| CN | 216835118 U | * | 6/2022 | B05B 11/1067 |

(Continued)

OTHER PUBLICATIONS

PCT Search Report and Written Opinion for PCT/CN2023/138748 dated Jun. 3, 2024, 11 pages.

*Primary Examiner* — Jennifer C Chiang

(74) *Attorney, Agent, or Firm* — Alexandra S. Anoff

(57) ABSTRACT

A foam pump assembly and a foam pump dispenser for providing a flowable and fine foam. The foam pump dispenser includes a container and a foam pump assembly. The foam pump assembly includes an actuator; a closure connected to the actuator and coupled to the container. The foam pump assembly further includes a foaming unit containing a plurality of interlocking mesh elements. The foaming unit includes at least 3 interlocking mesh elements each having one single mesh net. The at least 3 interlocking mesh elements are stacked together to produce a flowable and fine foam.

15 Claims, 12 Drawing Sheets

(56) References Cited

FOREIGN PATENT DOCUMENTS

| | | | | | |
|---|---|---|---|---|---|
| EP | 1599569 | B2 | | 4/2012 | |
| EP | 2937294 | B1 | | 7/2018 | |
| EP | 3022132 | B1 | | 10/2018 | |
| JP | 5921837 | B2 | | 4/2016 | |
| KR | 101807173 | B1 | | 1/2018 | |
| WO | WO-2013170445 | A1 | * | 11/2013 | ......... B05B 11/1087 |

* cited by examiner

Foam obtained
with a comparative foam pump assembly

Foam obtained
with a foam pump assembly
as recited in the claims

FOAM PUMP DISPENSER AND ITS FOAM PUMP ASSEMBLY

FIELD OF THE INVENTION

The present application generally relates to a foam pump dispenser comprising a container and a foam pump assembly. The foam pump assembly has an actuator, a closure, a pump body, a dip tube, an air piston, a liquid piston and a mixing chamber. The foam pump assembly further includes a foaming unit containing a plurality of interlocking mesh elements. The interlocking mesh elements are stacked together to produce a flowable and fine foam.

BACKGROUND OF THE INVENTION

Foam pump dispensers have become increasingly popular in the market due to their convenience and efficiency in delivering various liquid products. They are commonly used for dispensing items such as body washes, hand soaps, and other liquid foam products, e.g., shampoos, hand sanitizers, skin care compositions, scent products, dish detergents, surface cleaning products, and the like.

A pump assembly of a pump dispenser typically dispenses contents, e.g., liquid or gel from a bottle when a user pushes down on (or primes) an actuator, a piston puts pressure on a spring and moves a ball valve upward taking some liquid or gel with it. When the actuator is released, the piston and spring return to the resting positions, sealing off the housing chamber to stop liquid or gel from flowing back into the bottle, see for instance WO 2022/132693 A1. Foam-generating kits are known and can contain a foam-generating dispenser and a relatively high viscosity composition, see for instance EP 1 599 569 B2.

However, there is a need to improve the foam pump assembly to produce a flowable and fine foam that enhances the user experience. Foam pump dispensers typically rely on the interaction between an actuator, piston, spring, and ball valve to dispense liquid or gel. While these mechanisms are effective for certain applications, they often struggle to generate a consistently fine and flowable foam, especially for relatively high viscosity compositions. Existing foam pump assemblies may produce foam that is too thick, uneven, or inconsistent, resulting in suboptimal user experience and product performance.

Hence, there is still a need for providing a foam pump assembly specifically designed to address the challenges associated with producing a flowable and fine foam. By enhancing the foam quality, it is intended to enhance the user experience, by improving product efficacy, and meeting the growing demand for relatively high-performance foam pump dispensers.

SUMMARY OF THE INVENTION

A foam pump dispenser 1 for providing a flowable and fine foam is provided and comprises a container 40 comprising a neck 41 having a neck landing zone; and a foam pump assembly 50. The foam pump assembly 50 comprises: an actuator 10 having a cavity therein; a closure 20 connected to the actuator 10 and coupled to the neck 41 of the container 40 so that the foam pump assembly 50 is detachably attached to the container 40; a pump body 51 having a large diameter cylindrical portion 51*a* and a small diameter cylindrical portion 51*b*, wherein the large diameter cylindrical portion 51*a* is integrally formed with the small diameter cylindrical portion 51*b*; a dip tube 30 extending from the pump body 51, wherein the dip tube 30 is in fluid communication with the container 40. The foam pump assembly 50 comprises an air piston 52 sealing the large diameter cylindrical portion 51*a* of the pump body 51 and forming an air chamber 52*a*. The foam pump assembly 50 comprises a liquid piston 53 including an inner piston rod 54. The small diameter cylindrical portion 51*b* of the pump body 51 includes an inlet one-way valve 57 and a plug 55. The plug 55 prevents the inlet one-way valve 57 for escaping. Also, the plug 55 supports a coiled spring 56 and the inner piston rod 54 such that the liquid piston 53 and the small diameter cylindrical portion 51*b* of the pump body 51 forms a liquid chamber 53*a*. The foam pump assembly 50 comprises a mixing chamber 58 above the inner piston rod 54, wherein the contents from the container 40 and air are mixed to lead to a rough foam. The foam pump assembly 50 further includes a foaming unit 60 comprising a plurality of interlocking mesh elements 61. The foaming unit 60 comprises at least 3 interlocking mesh elements 61 each having one single mesh net 62. The at least 3 interlocking mesh elements 61 are stacked together to produce from the rough foam, a flowable and fine foam.

A foam pump assembly 50 is provided and comprises: a pump body 51 having a large diameter cylindrical portion 51*a* and a small diameter cylindrical portion 51*b*, wherein the large diameter cylindrical portion 51*a* is integrally formed with the small diameter cylindrical portion 51*b*; a dip tube 30 extending from the pump body 51, wherein the dip tube 30 is in fluid communication with the container 40; wherein the foam pump assembly 50 comprises an air piston 52 sealing the large diameter cylindrical portion 51*a* of the pump body 51 and forming an air chamber 52*a*. The foam pump assembly 50 comprises a liquid piston 53 including an inner piston rod 54. The small diameter cylindrical portion 51*b* of the pump body 51 includes an inlet one-way valve 57 and a plug 55. The plug 55 prevents the inlet one-way valve 57 for escaping. Also, the plug 55 supports a coiled spring 56 and the inner piston rod 54 such that the liquid piston 53 and the small diameter cylindrical portion 51*b* of the pump body 51 forms a liquid chamber 53*a*. The foam pump assembly 50 comprises a mixing chamber 58 above the inner piston rod 54 wherein liquid or gel contents and air are mixed to lead to a rough foam. The foam pump assembly 50 further includes a foaming unit 60 comprising a plurality of interlocking mesh elements 61. The foaming unit 60 comprises at least 3 interlocking mesh elements 61 each having one single mesh net 62. The at least 3 interlocking mesh elements 61 are stacked together to produce from the rough foam, a flowable and fine foam.

BRIEF DESCRIPTION OF THE DRAWINGS

While the specification concludes with claims particularly pointing out and distinctly claiming the present invention, it is believed that the same will be better understood from the following description read in conjunction with the accompanying drawings in which:

DETAILED DESCRIPTION OF THE INVENTION

Definitions of Terms

Figure 1:
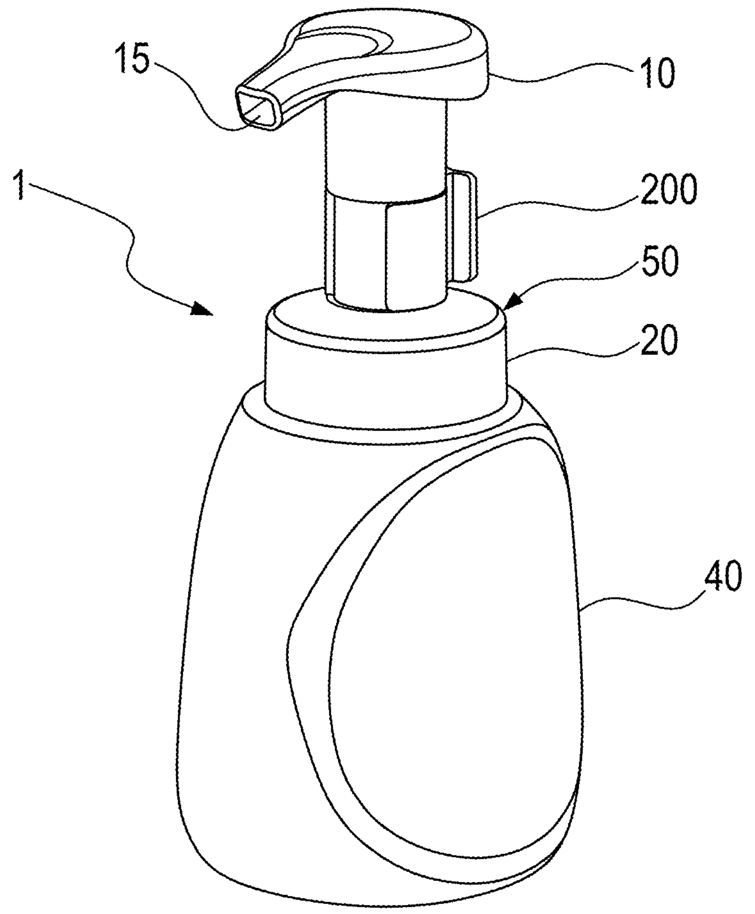
FIG. 1 provides a perspective view of a foam pump dispenser as shown and described herein.

In this document, the following definitions apply unless specifically stated otherwise.

The terms "comprise," "comprising," and "comprises" as used herein are open ended terms, each specifying the presence of what follows, e.g., a component, but not precluding the presence of other features, e.g., elements, steps or components known in the art, or disclosed herein. "Comprising" encompasses the terms "consisting of" and "consisting essentially of". The pump dispensers, pump assemblies, methods, uses, and processes described herein can comprise, consist of, and consist essentially of the elements and limitations of the invention described herein, as well as any of the additional or optional ingredients, components, steps, or limitations described herein. Embodiments and aspects described herein may comprise or be combinable with elements, features or components of other embodiments and/or aspects despite not being expressly exemplified in combination, unless an incompatibility is stated.

As used herein, the articles including "a" and "an" when used in a claim, are understood to mean "one or more" or "at least one" of what is claimed or described and should not be limited to "only one" unless explicitly indicated to the contrary.

The terms "include," "includes," and "including," as used herein are meant to be non-limiting.

The term "consumer product" as used herein means products intended to be used or consumed in the form in which it is sold. Such products include but are not limited to products for and/or uses relating to treating as a surface of interest, keratin fibers, hair, skin or fabrics. As used herein "consumer product" means baby care, beauty care, fabric & home care, family care, feminine care, health care, snack and/or beverage products or devices intended to be used or consumed in the form in which it is sold, and not intended for subsequent commercial manufacture or modification. Such products include but are not limited to fine fragrances (e.g., perfumes, colognes, eau de toilettes, after-shave lotions, pre-shave, face waters, tonics, and other fragrance-containing compositions for application directly to the skin), diapers, bibs, wipes; products for and/or methods relating to treating human hair, including, bleaching, coloring, dyeing, conditioning, shampooing, styling; deodorants and antiperspirants; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; products and/or methods relating to oral care including toothpastes, tooth gels, tooth rinses, denture adhesives, tooth whitening; over-the-counter health care including cough and cold remedies, and pain relievers.

The term "cleaning composition" as used herein includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type; machine dishwashing agents, including the various pouches, tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

The term "fabric care composition" as used herein includes, unless otherwise indicated, fabric softening compositions, fabric enhancing compositions, fabric freshening compositions and combinations thereof. The form of such compositions includes liquids, gels, beads, powders, flakes, and granules.

The term "personal cleansing composition" as used herein refers to compositions intended for topical application to the hair and the skin for cleansing.

The term "mixtures" as used herein is meant to include a simple combination of materials and any compounds that may result from their combination.

The term "surface of interest" as used herein refers to hair when the composition is a cleansing composition in the form of a hair shampoo, or a hair conditioner; alternatively, to skin when the cleansing composition is in the form of a personal care product such as a shower or bath cream, a body wash or foaming body wash; alternatively to fabrics such as a liquid detergent or a fabric softener.

All percentages are by weight (w/w) of the composition or the foam pump dispenser or the foam pump assembly, unless otherwise specified. "% wt." means percentage by weight. References to 'parts' e.g., a mixture of 1 part X and 3 parts Y, is a ratio by weight. All ratios or percentages are weight ratios or weight percentages unless specifically stated otherwise.

Where amount ranges are given, these are to be understood as being the total amount of said ingredient in the composition, the consumer product, or the package component (pump dispenser, pump assembly), or where more than one species fall within the scope of the ingredient definition, the total amount of all ingredients fitting that definition, in the composition, the consumer product or the package component.

The amount of each particular ingredient or mixtures thereof described hereinafter can account for up to 100% (or 100%) of the total amount of the ingredient(s) in the composition, the consumer product, or the package component.

As used herein, the expressions "comprising from;" "ranging from" and "between" are inclusive of the endpoints of the recited range(s).

The number of significant digits conveys neither a limitation on the indicated amounts nor on the accuracy of the measurements. All numerical amounts are understood to be modified by the word "about" unless otherwise specifically indicated.

All numeric ranges are inclusive and combinable to form narrower ranges not explicitly disclosed. For example, delineated upper and lower range limits are interchangeable to create further ranges.

The term "free of" as used herein means that a specific ingredient of a composition or a component of the foam pump dispenser or the foam pump assembly, e.g., the foam pump dispenser comprises 0% of an ingredient by total weight of specific component of the pump dispenser thus no detectable amount of the stated ingredient.

The term "substantially free of" as used herein means less than 1%, less than 0.8%, less than 0.5%, less than 0.3%, less than 0.1%, or less than an immaterial amount of a stated ingredient by total weight of the composition or the foam pump dispenser or the foam pump assembly.

The term "room temperature" refers to a temperature of 25° C.

All measurements are understood to be made at 25° C. and at ambient conditions, where "ambient conditions" means at 1 atmosphere (atm) of pressure and at 65% relative humidity, unless otherwise stated. "Relative humidity" refers to the ratio (stated as a percent) of the moisture content of air compared to the saturated moisture level at the same temperature and pressure. Relative humidity can be measured with a hygrometer, in particular with a probe hygrometer from VWR® International.

There is a need to provide foam pumps dispensers, foam pump assemblies and methods of providing a flowable and fine foam as described in the Summary or as described hereinbelow for fulfilling the technical effects or goals as set out herein. The advantages as may be apparent to those skilled in the art can be achieved through the foam pumps dispensers, foam pump assemblies and methods of providing a flowable and fine foam as described herein.

Foam Pump Dispenser

A foam pump dispenser 1 is provided and comprises a container 40 comprising a neck 41 having a neck landing zone; and a foam pump assembly 50.

FIG. 1 provides a perspective view of a foam pump dispenser 1 that includes a container 40 coupled to a foam pump assembly 50 in a locked storage position. The foam pump assembly 50 includes an actuator 10, a closure 20 and an optional clip 200. The closure 20 is connected to the actuator 10. More specifically, the closure 20 is coupled to the neck 41 (not shown) of the container 40. The closure 20 may be threadingly engaged with the neck 41 of the container 40. A foam discharged from the foam pump dispenser 1 is discharged through an actuator outlet 15 of the actuator 10.

Figure 2:
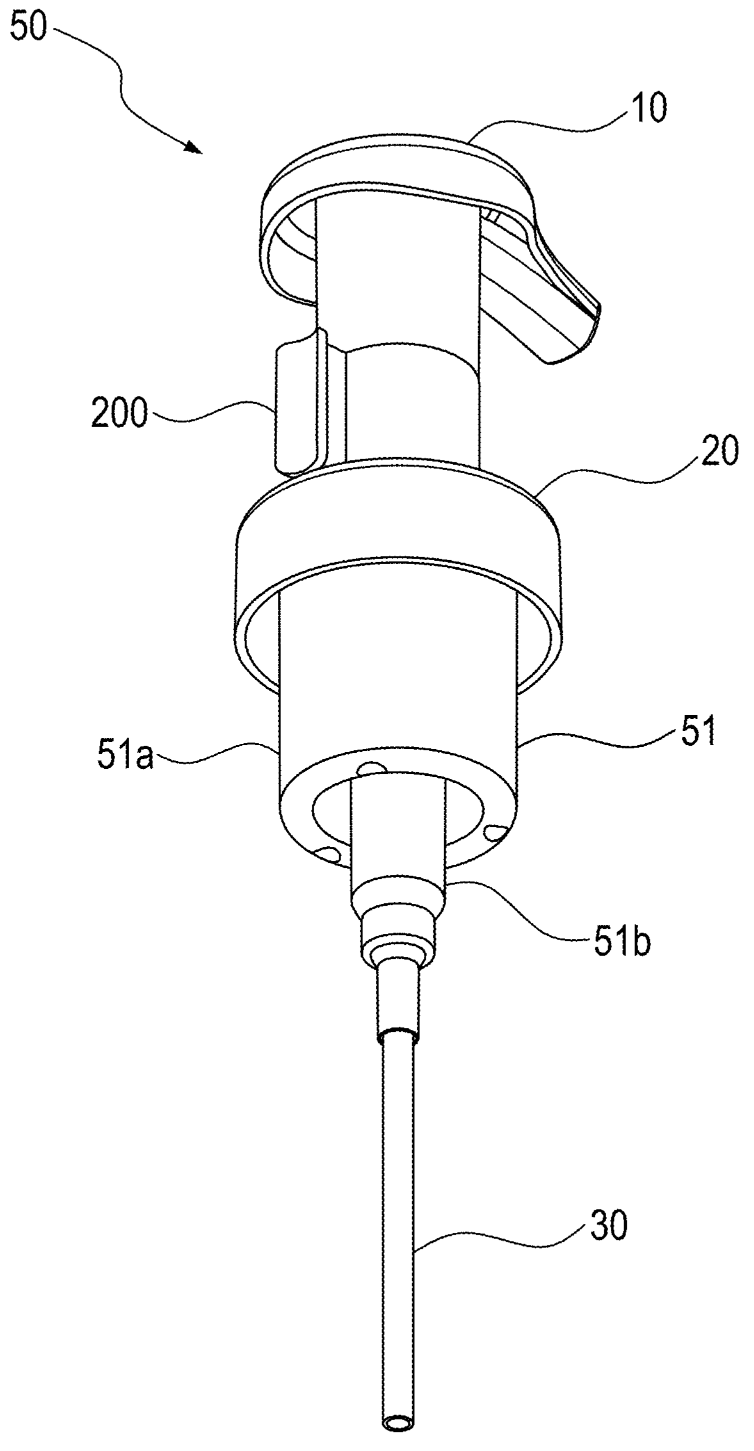
FIG. 2 provides a perspective view of a foam pump assembly according to one or more aspects.

FIG. 2 provides a perspective view of a foam pump assembly 50 including an actuator 10, a closure 20 connected to the actuator 10, the optional clip 200, a pump body 51 having a large diameter cylindrical portion 51*a* and a small diameter cylindrical portion 51*b*, and a dip tube 30.

Figure 3:
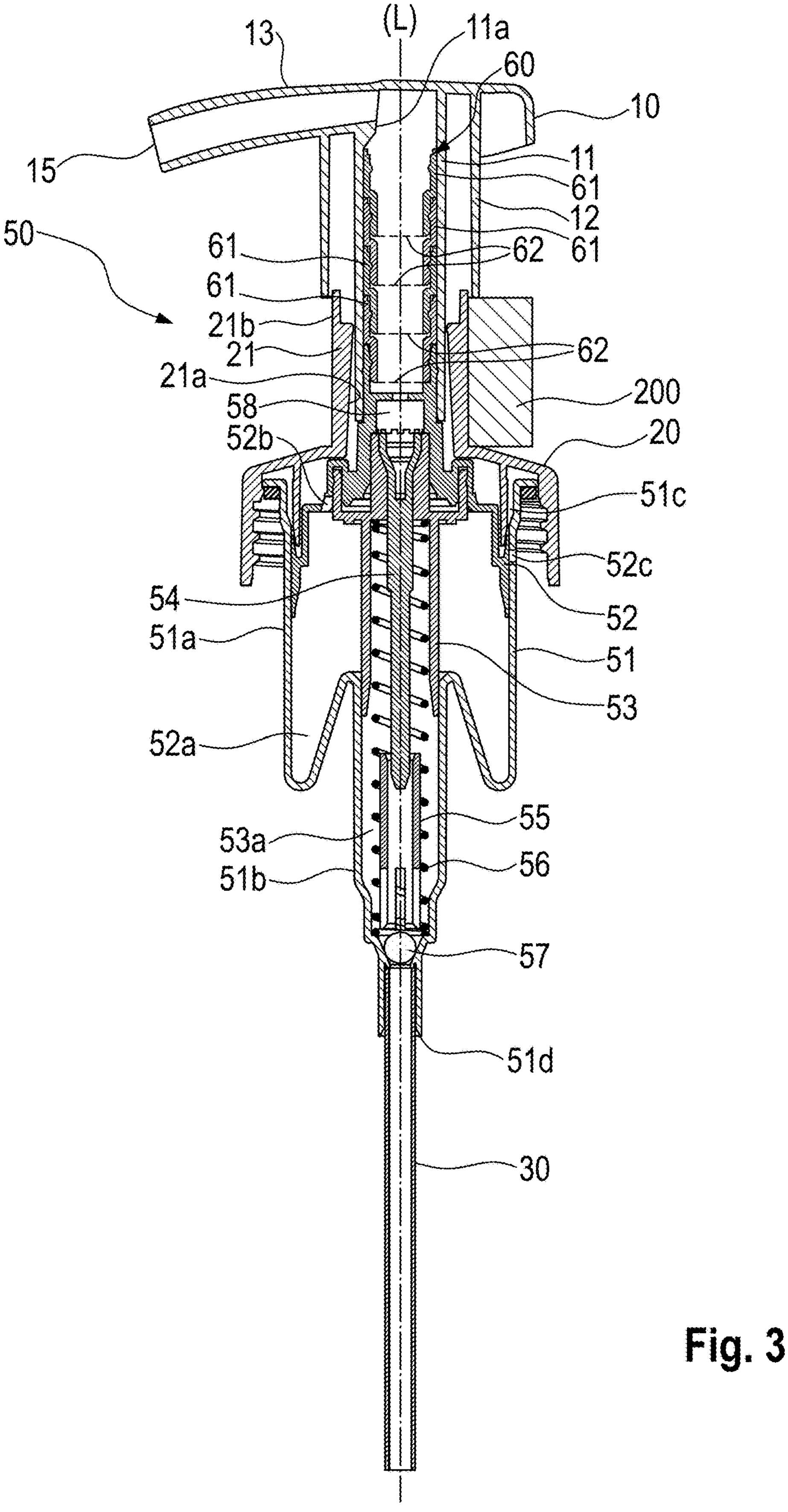
FIG. 3 provides a cross-sectional view of the foam pump assembly of FIG. 2.

FIG. 3 provides a cross-sectional view of the foam pump assembly of FIG. 2.

The actuator 10 may comprise a first cylindrical portion 11 that is inserted into the inner side 21*a* of a tubular portion 21 protruding upward from a radially central side of the closure 20 and extends in an up-down direction or along a longitudinal axis L, as shown in a FIG. 3.

The actuator 10 may comprise a second cylindrical portion 12 that covers an outer peripheral portion 21*b* of the tubular portion 21 of the closure 20 and extends in the up-down direction or along the longitudinal axis L.

The actuator 10 may also comprise a nozzle portion 13 that extends in a radial direction of the first cylindrical portion 11 from an upper part 11*a* of the first cylindrical portion 11. The actuator outlet 15 resides at an extremity of the nozzle portion 13.

Optionally, the foam pump dispenser 1 may further comprise a clip 200 to lock the actuator 10 before a first use, wherein the clip 200 is positioned between the actuator 10 and the closure 20.

Alternatively, the actuator 10 may be typically auto-locked. In that aspect, the actuator 10 may be typically unlocked by rotating the actuator at 90 degrees.

Foam Pump Assembly

The foam pump assembly 50 of the foam pump dispenser 1 comprises an actuator 10 having a cavity therein; a closure 20 connected to the actuator 10 and coupled to the neck 41 of the container 40; a pump body 51; and a dip tube 30.

Figure 4:
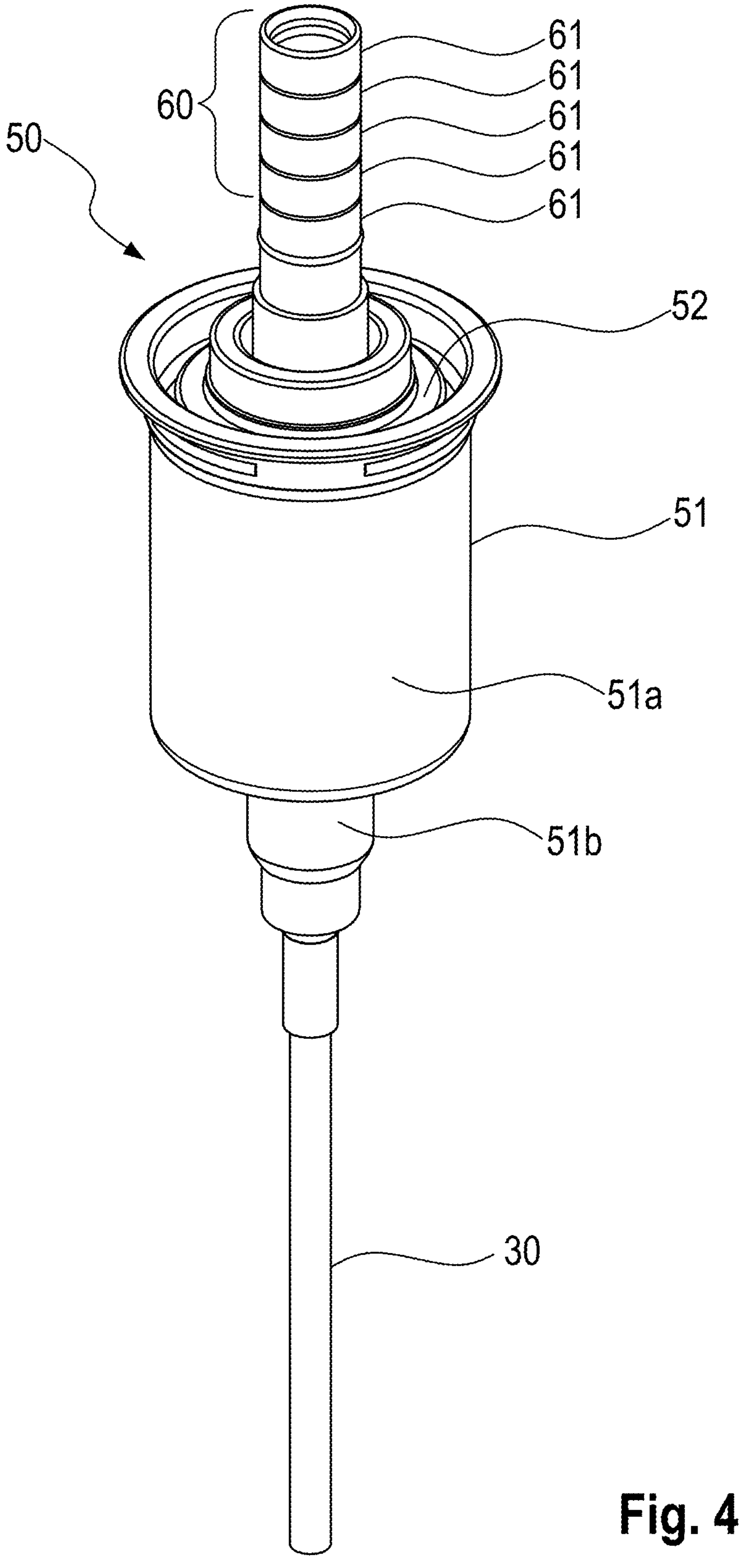
FIG. 4 provides a front perspective view of a foam pump assembly without an actuator, a closure, a clip according to one or more aspects.

FIG. 4 provides a front perspective view of a foam pump assembly 50 wherein the actuator 10, the closure 20 and the clip 200 have been removed.

Figure 5:
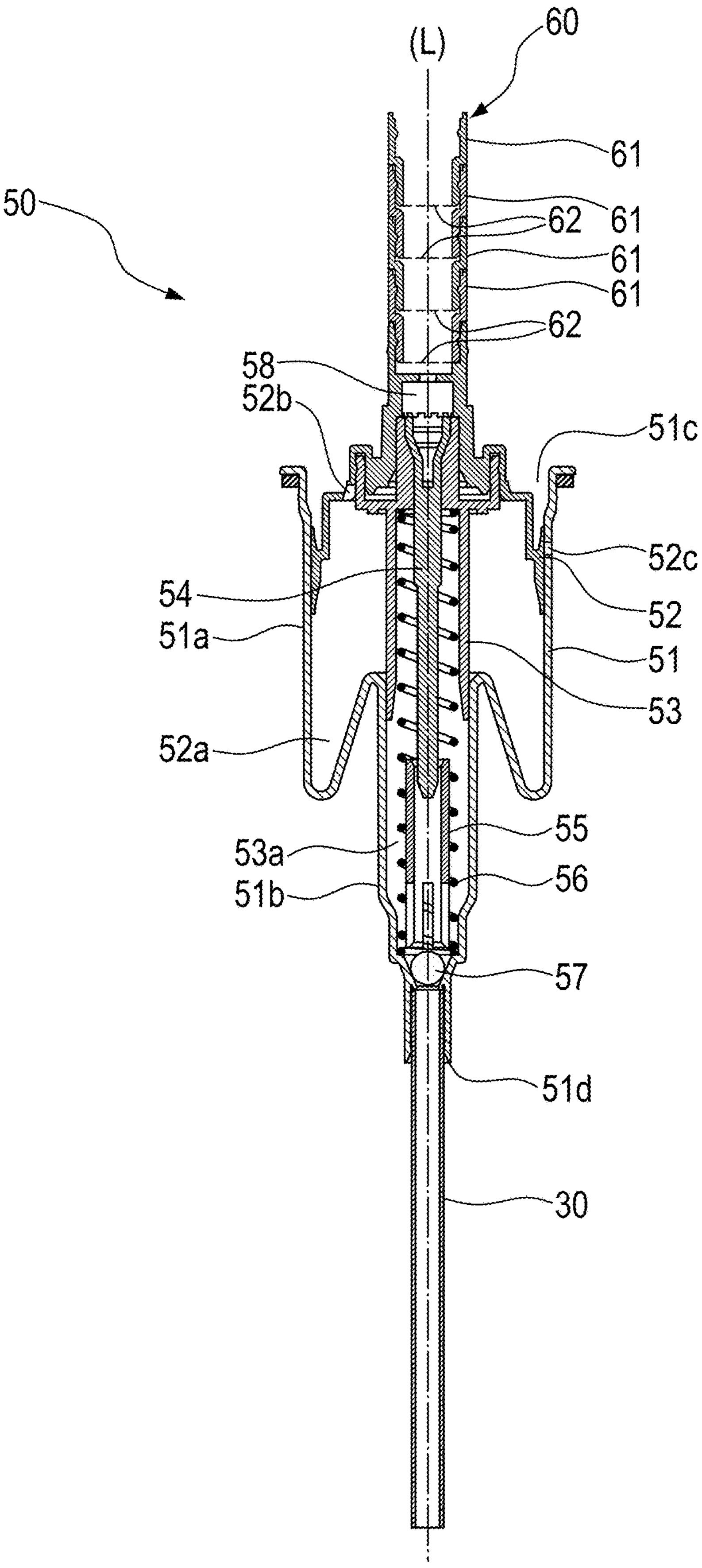
FIG. 5 provides a cross-sectional view of the foam pump assembly of FIG. 4.

FIG. 5 provides a cross-sectional view of the foam pump assembly of FIG. 4.

The foam pump dispenser 1 or the foam pump assembly 50 may have the longitudinal axis (L) coaxial with the pump body 51, the dip tube 30 and the closure 20 for instance.

The foam pump assembly 50 includes a pump body 51 having a large diameter cylindrical portion 51*a* and a small diameter cylindrical portion 51*b*. The large diameter cylindrical portion 51*a* of the pump body 51 is integrally formed with the small diameter cylindrical portion 51*b* of the pump body 51.

In other words, the large diameter cylindrical portion 51*a* and the small diameter cylindrical portion 51*b* of the pump body 51 is integrated in a single body. Thus, the small diameter cylindrical portion 51*b* concentrically extends downwards from a lower side of the large diameter cylindrical portion 51*a* and is coupled to the closure 20 through coupling between the large diameter cylindrical portion 51*a* and the closure 20, as shown in a FIG. 3 or FIG. 5.

The pump body 51 of the foam pump assembly 50 is a component to be inserted in the container 40. The pump body 51 of the foam pump assembly 50 may include a pump body outlet 51*c* and a pump body inlet 51*d*. The pump body 51 of the foam pump assembly 50 can receive contents discharged from the container 40 through the pump body inlet 51*d* and air from the outside or from the pump body outlet 51*c*.

The dip tube 30 may provide for fluid communication between a content, e.g., liquid or gel, contained in the container 40 and the foam pump assembly 50. The dip tube 30 may have a lower end that resides in the contents of the container 40 and an upper end that is connected to the foam pump assembly 50, especially the small diameter cylindrical portion 51*b* of the pump body 51 at or adjacent to the pump body inlet 51*d*. The contents of the container 40, e.g., liquid or gel contents, may be transported through the dip tube 30 by way of a difference in pressure between the lower end and the upper end of the dip tube 30. The pressure difference may be provided by a pump applying suction to the upper end of the dip tube 30. The dip tube 30 may be ordinary flexible plastic tubing.

Typically, the foam pump assembly 50 comprises an air piston 52 sealing the large diameter cylindrical portion 51*a* of the pump body 51 and forming an air chamber 52*a*. In other words, the air chamber 52*a* is the portion of the pump body 51 having the large diameter cylindrical portion 51*a* of the pump body 51 and sealed by the air piston 52.

The large diameter cylindrical portion 51*a* of the pump body 51 has a space which receives air introduced from the outside. Air can be introduced between the first cylindrical portion 11 of the actuator 10 and the tubular portion 21 of the closure 20. Air can pass through one or more air ventilating holes (52*b*, 52*c*) located at the air piston 52 and/or between the air piston 52 and the closure 20.

The large diameter cylindrical portion 51*a* of the pump body 51 is open at an upper side or the pump body outlet 51*c* thereof, and the open upper side of the large diameter cylindrical portion 51*a* of the pump body 51 is sealed by the air piston 52. As shown in a FIG. 3 or FIG. 5, the large diameter cylindrical portion 51*a* of the pump body 51 is coaxially coupled with an inner side of the closure 20.

Also, the foam pump assembly 50 comprises a liquid piston 53 including an inner piston rod 54. The liquid piston 53 and the small diameter cylindrical portion 51*b* of the pump body 51 forms a liquid chamber 53*a*.

The small diameter cylindrical portion 51*b* of the pump body 51 has a space which receives the contents discharged by the container 40. The small diameter cylindrical portion 51*b* of the pump body 51 is formed at a lower side thereof with the pump body inlet 51*d* through which the small diameter cylindrical portion 51*b* of the pump body 51 communicates with the container 40.

The small diameter cylindrical portion 51*b* of the pump body 51 includes an inlet one-way valve 57 and a plug 55.

The pump body inlet 51*d* is thus provided with the inlet one-way valve 57 which opens and closes the pump body inlet 51*d*.

The pump body 51 includes the inlet one-way valve 57 such that the inlet one-way valve 57 permits fluid flow in a downstream direction from the container 40 or the dip tube 30 towards the pump body 51 and the actuator 10 to prevent fluid flow in an upstream direction.

Preferably, the inlet one-way valve 57 may be positioned between the plug 55 and the dip tube 30.

The inlet one-way valve 57 may be typically chosen from a free-floating ball check valve, a spring-loaded ball check valve, a diaphragm check valve, a swing check valve, a flapper valve, a clapper valve, a backwater valve, a lift check valve, an in-line check valve, an umbrella valve, or a duckbill valve.

The plug 55 prevents the inlet one-way valve 57 for escaping. Also, the plug 55 supports a coiled spring 56 and the inner piston rod 54 such that the liquid piston 53 and the small diameter cylindrical portion 51*b* of the pump body 51 forms the liquid chamber 53*a*.

The coiled spring 56 is thus positioned between the inner piston rod 54 and the plug 55 within the liquid chamber 53*a*. The coiled spring 56 seats onto the plug 55 and sleeves the plug 55 and the inner piston rod 54. The coiled spring 56 is positioned within a hollow inner cavity of the liquid piston 53 and a hollow inner cavity of the small diameter cylindrical portion 51*b* of the pump body 51.

In all aspects, the coiled spring 56 may comprise a design, wherein the design is chosen from single helix, double helix, stacked double helix, wave spring, or combinations thereof.

The foam pump assembly 50 comprises a mixing chamber 58 located above the inner piston rod 54 wherein the contents, e.g., liquid or gel contents, from the container 40 and air are mixed to lead to a rough foam.

FIG. 3 provides a cross-sectional view of the foam pump assembly 50 of FIG. 2. with the outlet 15 of the actuator 10, from which the foamed contents are dispensed. The contents of the container 40 enters the foam pump assembly 50 via the dip tube 30, and flows past the inlet one-way valve 57, e.g., a ball, and into the pump body 51. A plug 55 can prevent the inlet one-way valve 57 from escaping, and also supports a coil spring 56 and an inner piston rod 54. A liquid piston 53 creates a suction which draws the contents of the container 40 past the inlet one-way valve 57 and the plug 55 into the liquid chamber 53*a* and thereby primes the foam pump assembly 50. Meanwhile, the air chamber 52*a* and the air piston 52 are also primed, and when the actuator 10 is depressed, both the air from the air chamber 52*a* and the contents from the liquid chamber 53*a* are turbulently forced into the mixing chamber 58. Air and liquid or gel contents are mixed such that a rough foam is generated.

Typically, it is known that the rough foam could pass a mesh holder having one or two meshes. However, it has now be found that a fine and flowable foam could be obtained when the foam pump assembly 50 further includes a foaming unit 60 comprising a plurality of interlocking mesh elements 61. The foaming unit 60 comprises at least 3 interlocking mesh elements 61 each having one single mesh net 62. The at least 3 interlocking mesh elements 61 are stacked together to produce from the rough foam, a flowable and fine foam.

FIG. 3 and FIG. 5 show a foaming unit 60 comprising 4 interlocking mesh elements 61 each having one single mesh net 62. The interlocking mesh elements 61 are stacked together.

Figure 6:
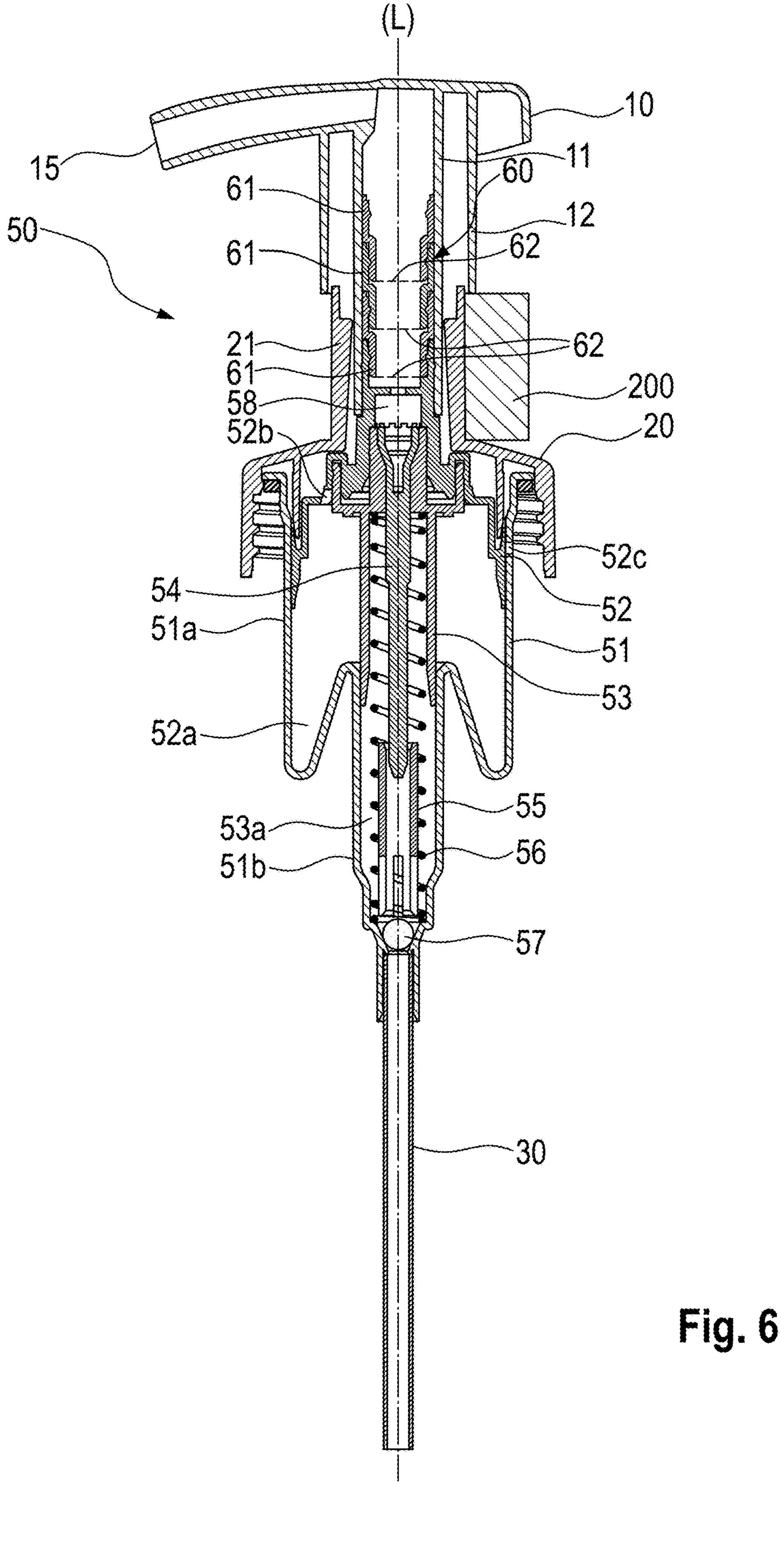
FIG. 6 provides a cross-sectional view of another foam pump assembly according to one or more aspects.

FIG. 6 shows a foaming unit 60 comprising 3 interlocking mesh elements 61 each having one single mesh net 62. The interlocking mesh elements 61 are stacked together.

The foaming unit 60 may be connected to the air piston 52 above the mixing chamber 58. The foaming unit 60 may reside within the actuator 10. In that aspect, the foaming unit 60 may be positioned within an inner side of the first cylindrical portion 11 of the actuator 10.

Figure 7:
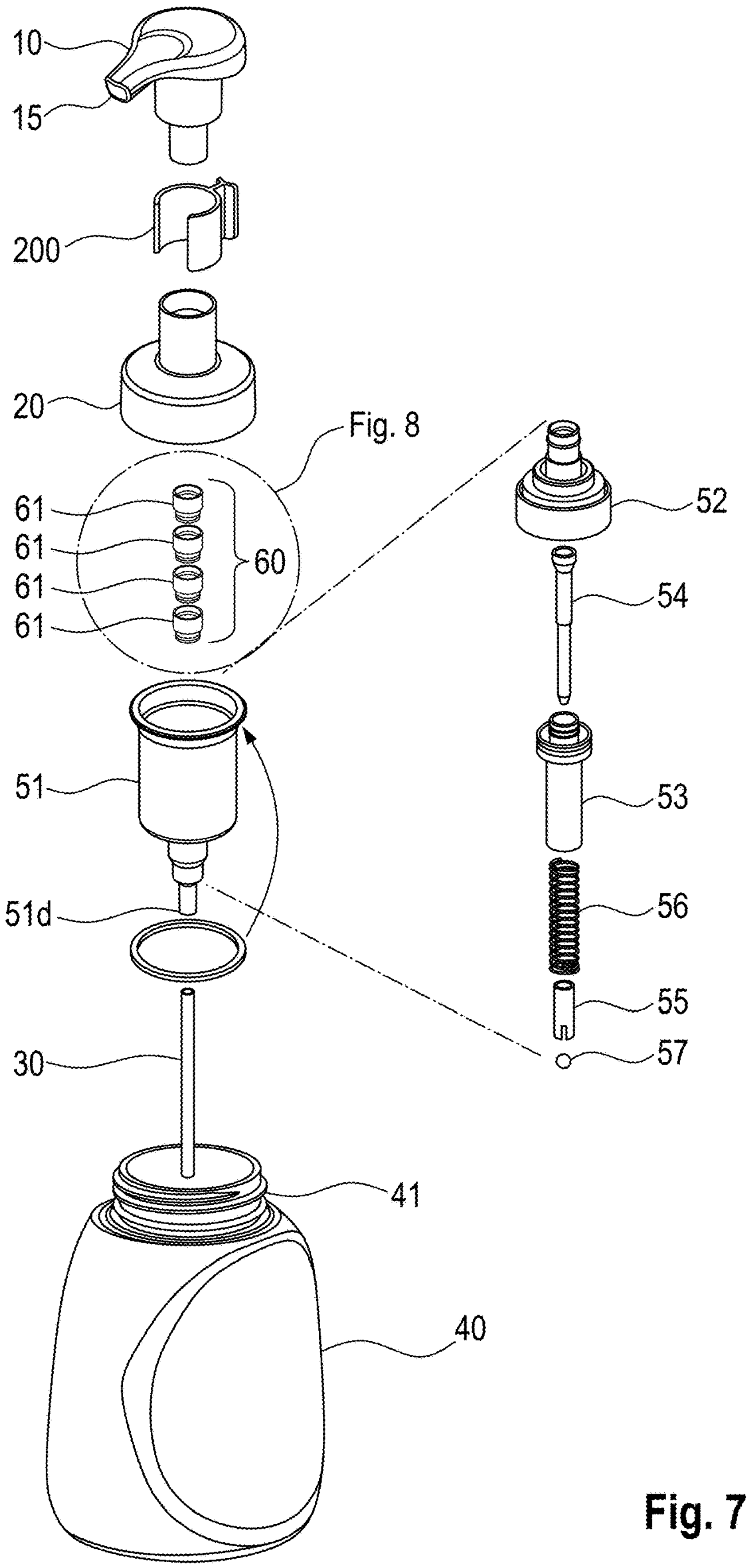
FIG. 7 provides an exploded view of the foam pump dispenser of FIG. 1 including the foam pump assembly of FIG. 2 in a disassembled form, according to one or more aspects.

FIG. 7 provides an exploded view of the foam pump dispenser 1 of FIG. 1 and the foam pump assembly 50 of FIG. 2 in a dissembled form. FIG. 7 shows how the different components of the foam pump dispenser 1 can be inserted and connected together. The inlet one-way valve 57 (here a ball) is introduced in the pump body 51 and a dip tube 30 is connected to the piston body inlet 51*d*. The inner piston rod 54 is introduced in the liquid piston 53 with the plug 55. The liquid piston 53 and the plug 55 are both sleeved by the coiled spring 56. The resulting assembly is introduced in the pump body 51 such that the plug 55 impedes the inlet one-way valve 57 from escaping. The air piston 52 then closes the upper side of the pump body 51. A foaming unit 60 comprising 4 interlocking mesh elements 61 that are stacked together is attached to the air piston 52. The actuator 10 is connected to the closure 20 and the piston assembly is connected to the closure 20 to lead to the foam pump assembly 50. The resulting foam pump assembly 50 is then inserted and engaged, e.g., threadingly screwed, with the container 40 containing liquid or gel contents. The closure 20 is threadingly screwed with the neck 41 of the container 40.

The foaming unit 60 will be now described in more details. The foaming unit 60 comprising a plurality of interlocking mesh elements 61.

Figure 8:
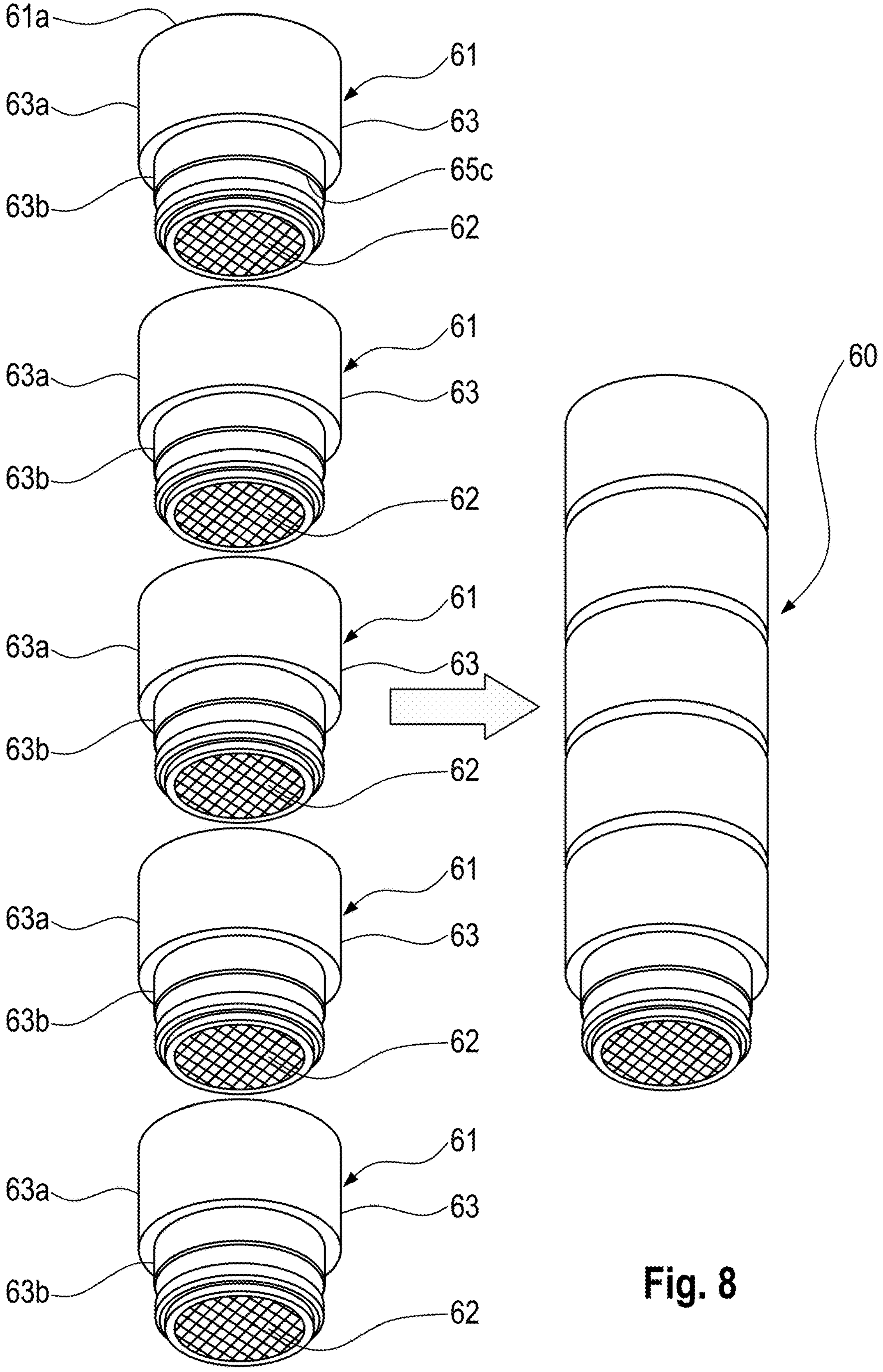
FIG. 8 provides an enlarged view of a foaming unit in a disassembled and assembled forms.
Figure 9:
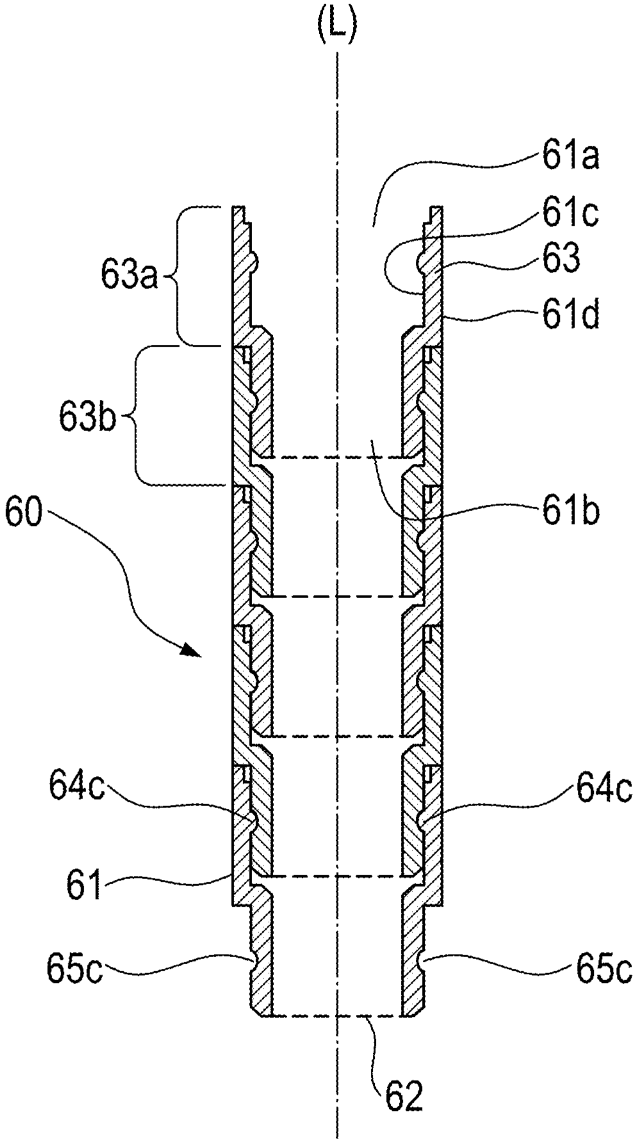
FIG. 9 provides a cross-sectional view of the foaming unit of FIG. 8 in an assembled form.

FIG. 8 provides an enlarged view of a foaming unit 61 in a disassembled and assembled forms. FIG. 9 provides a cross-sectional view of the foaming unit 61 of FIG. 8 in an assembled form.

The mesh element 61 may be a sleeve having an open top 61*a* and an open bottom 61*b*. The mesh element 61 may have a side wall 63 having an inner surface 61*c* and an outer surface 61*d*. The mesh element 61 may have an upper portion 63*a* and a lower portion 63*b*. The upper portion 63*a* and the lower portion 63*b* of the mesh element 61 may be integrally formed. The mesh element 61 forms a central opening coaxial to the longitudinal axis L, as shown for instance in FIG. 9.

The upper portion 63*a* of the mesh element 61 may have a diameter greater than a diameter of the lower portion 63*b* of the mesh element 61.

The side wall 63 of the mesh element 61 shall not be limited to a cylindrical ring. The mesh element 61 may have any suitable outer shape, including, e.g., a generally cylindrical shape, a generally conical shape, a generally elliptical shape, or any combination thereof. Examples of such "generally cylindrical" and "generally conical" or "generally elliptical" mesh element 61 may include, without limitation, the mesh element 61 having a cross-sectional shape deviating from circular by being elongated in a direction transverse to the longitudinal axis L of the mesh element 61, e.g., elliptical, oval, and the like. The mesh element 61 may have other suitable shapes as well, e.g., polygonal, rectangular prism, cuboid, and so on or a combination of generally cylindrical/conical and polygonal shapes.

Figure 10B:
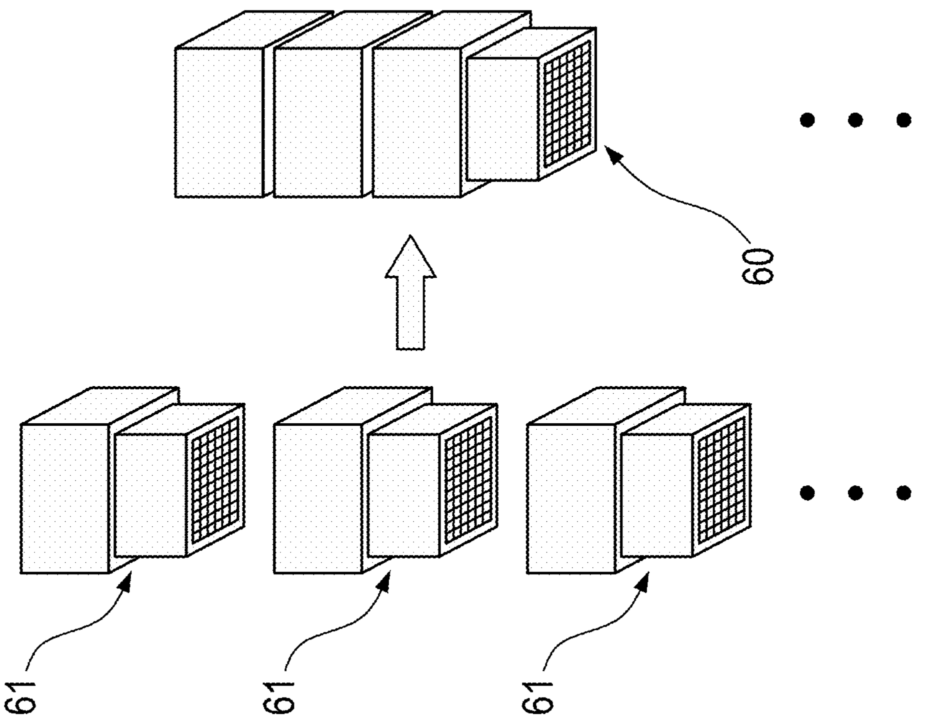
FIG. 10A and FIG. 10B provide enlarged views of other foaming units in a disassembled and assembled forms with different geometries according to one or more aspects.
Figure 10A:
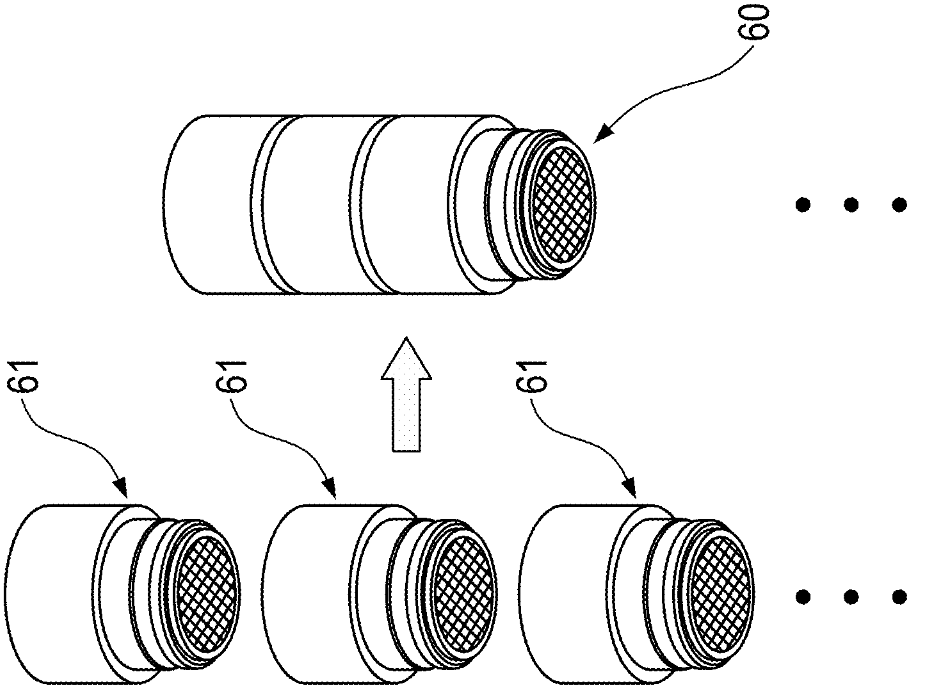

The side wall 63 of the mesh element 61 may be a ring or a square, see FIG. 10A and FIG. 10B for an example.

The side wall 63 of the mesh element 61 may include a ring, wherein the side wall 63 has an upper portion 63*a* and a lower portion 63*b*, wherein the upper portion 63*a* of the mesh element 61 has a diameter greater than a diameter of the lower portion 63*b* of the mesh element 61.

Each mesh element may comprise two engagement ribs (64*a*, 64*b*, not shown) vertically disposed on an inner surface of the large diameter portion 63*a* of the side wall 63 of the mesh element 61. Each mesh element 61 may also comprise two engagement recesses (65*a*, 65*b*, not shown) vertically disposed on an outer surface of the small diameter portion 63*b* of the side wall 63 of the mesh element 61. The two engagement ribs (64*a*, 64*b*) of a first mesh unit (61*a*) can interlock with the corresponding engagement recesses (65*a*, 65*b*) of second mesh unit (61*b*) when the first and second mesh units (61*a*, 61*b*) are stacked together.

The two engagement ribs (64*a*, 64*b*) of a mesh unit (61) may be diametrically opposed to each other.

Alternatively or additionally, the two engagement recesses (65*a*, 65*b*) of a mesh unit (61) may be diametrically opposed to each other.

Alternatively, each mesh element may comprise a circular engagement rib 64*c* vertically disposed on an inner surface of the large diameter portion 63*a* of the side wall 63 of the mesh element 61. Each mesh element 61 may also comprise a circular engagement recess 65*c* vertically disposed on an outer surface of the small diameter portion 63*b* of the side wall 63 of the mesh element 61. The circular engagement rib 64*c* of a first mesh unit 61*a* can interlock with the corresponding circular engagement recess 65*c* of second mesh unit 61*b* when the first and second mesh units (61*a*, 61*b*) are stacked together, as shown in FIGS. 8-9.

Hence, the engagement rib(s) (64*a-c*) and the engagement recess(es) (65*a-c*) allows each mesh unit (61, 61*a-e*) to be stacked one on each other.

Each mesh element 61 may include the one single mesh net 62 positioned at or adjacent to the open bottom 61*b* of each mesh element 61.

It has been found that the foaming unit 61 comprising at least 3 interlocking mesh elements 61 can provide a flowable and fine foam. In that aspect, the foam may have a flowability above 50 s as measured according to the Foam Flowability Test Method as set out herein. The foam may further have a pressing force of less than 30 N as measured according to the Maximal Pump Pressing Force Test Method as set out herein.

The mesh net 62 may have some specific characteristics that will now be detailed. The mesh net 62 may be composed of a material, wherein the material is selecting from the group consisting of polyethylene terephthalate, polypropylene, polyethylene, nylon and metal. Preferably The mesh net 62 may be composed of polyethylene terephthalate.

The mesh net 62 may comprise a mesh number below or equal to 400 mesh, preferably from 20 to 200 mesh, more preferably from 50 to 100 mesh. The mesh number of the mesh net 62 can help for obtaining a fine and creamy foam.

The foaming unit 60 may comprise from 3 to 100, preferably from 3 to 20, more preferably from 3 to 10, most preferably from 3 to 6 interlocking mesh elements 61.

The mesh net 62 may have a mesh pore size from 0.1 μm to 1000 μm, preferably from 120 μm to 750 μm, more preferably from 150 μm to 600 μm, most preferably from 200 μm to 500 μm.

Typically, the mesh net 62 may have a first plurality of filamentary portions extending along a first direction with a certain interval from each other, and a second plurality of filamentary portions extending along a second direction orthogonal to the first direction with a certain interval from each other. The mesh net 62 may have a plurality of pore portions having a substantially rectangular shape, wherein the plurality of pore portions are defined by the first plurality of filamentary portions and the second plurality of filamentary portions. The shape of the plurality of pore portions may not be necessarily limited to a rectangular shape, and may have various shapes such as a circle, an ellipse, a triangle, and a polygon.

The mesh net 62 may have a thickness as measured along the longitudinal axis (L) from 50 to 150 μm.

The foaming unit 60 and the mesh net 62 as described hereinabove can help for preventing any clogging.

Exemplary Packaging Materials

A variety of thermoplastic materials or rigid and semi-rigid materials may be used for the foam pump dispenser 1, the container 40 and the foam pump assembly 50, and other components of the foam pump dispenser 1 herein unless otherwise specifically indicated. For example, rigid and semi-rigid materials may include, but are not limited to, metals, including but not limited to, aluminum, magnesium alloy, steel; glass; including but not limited to, laminates and polymeric materials such as polypropylene (PP), polyethylene (PE), polystyrene (PS), polyethylene-terephthalate (PET), styrene-acrylonitrile copolymer (SAN), polyethylene-terephthalate copolymers, polycarbonate (PC), polyamides, acrylonitrile-butadiene-styrene (ABS), thermoplastic elastomers, polyoxymethylene copolymer and mixtures thereof.

Any of the aforementioned polyolefins could be sourced from bio-based feedstocks, such as sugarcane or other agricultural products, to produce a bio-polypropylene or bio-polyethylene.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically modified starch and polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials. For example, the blend may be a combination of materials derived from virgin bio-derived or petroleum-derived materials, or recycled materials of bio-derived or petroleum-derived materials. One or more of the thermoplastic materials in a blend may be biodegradable. Thermoplastic materials may be biodegradable.

The thermoplastic material may also be, for example, a polyester. Exemplary polyesters include, but are not limited to, polyethylene terephthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly (acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material may also be a blend of multiple polymeric and non-polymeric materials. The thermoplastic material may be, for example, a blend of high, medium, and low molecular polymers yielding a multi-modal or bi-modal blend. The multi-modal material may be designed in a way that results in a thermoplastic material that has superior flow properties yet has satisfactory chemo/physical properties. The thermoplastic material may also be a blend of a polymer with one or more small molecule additives. The small molecule could be, for example, a siloxane or other lubricating molecule that, when added to the thermoplastic material, improves the flowability of the polymeric material.

Polymeric materials may also include various fillers known to the skilled artisan, such as, for example, mica, interference pigments, wood flour; or materials that are capable of "blooming" to the surface of a molded component. Other additives may include inorganic fillers such calcium carbonate, calcium sulfate, talcs, clays (e.g., nanoclays), aluminum hydroxide, calcium silicate ($CaSiO_3$), glass formed into fibers or microspheres, crystalline silicas (e.g., quartz, novacite, crystallobite), magnesium hydroxide, mica, sodium sulfate, lithopone, magnesium carbonate, iron oxide; or organic fillers such as rice husks, straw, hemp fiber, wood flour, or wood, bamboo or sugarcane fiber.

The mesh unit 61 may be composed of a material, wherein the material is selecting from the group consisting of polyethylene terephthalate, polypropylene, polyethylene, nylon and metal, preferably polypropylene.

The foam pump dispenser 1, the container 40 and the foam pump assembly 50, and other components of the foam pump dispenser 1 herein may be preferably disposable and recyclable. The foam pump dispenser 1 may be made of a sustainable material chosen from a recycled material or a renewable material.

Examples of renewable materials include bio-polyethylene, bio-polyethylene terephthalate, and bio-polypropylene. As used herein and unless otherwise noted, "polyethylene" encompasses high density polyethylene (HDPE), low density polyethylene (LDPE), linear low density polyethylene (LLDPE), and ultra-low density polyethylene (ULDPE). As used herein and unless otherwise noted, "polypropylene" encompasses homopolymer polypropylene, random copolymer polypropylene, and block copolymer polypropylene.

As used herein, "recycled" materials encompass post-consumer recycled (PCR) materials, post-industrial recycled (PIR) materials, and a mixture thereof. The pump dispenser 1 or pump assembly 50 may be composed of recycled high density polyethylene, recycled polyethylene terephthalate, recycled polypropylene, recycled LLDPE, or recycled LDPE, preferably recycled high density polyethylene, recycled polyethylene terephthalate, or recycled polypropylene, more preferably recycled high density polyethylene or recycled polyethylene terephthalate.

The sustainable material may contain one or more bio-derived polymers or plastics chosen from bio-derived polyethylene, bioderived high-density polyethylene, bio-derived polypropylene, bio-derived polyethylene terephthalate, or mixtures thereof, see for instance CA2762589A1, which is incorporated herein by reference.

However, the foam pump dispenser 1 or foam pump assembly 50 may be substantially free, preferably free of a plastic polymeric material chosen from polyethylene, polypropylene, polyethylene terephthalate, polyester, polyamide, polystyrene, polyvinyl chloride, or mixtures thereof.

In that aspect, the mesh unit 61 may be composed of a bioderived material, wherein the bioderived material is selecting from the group consisting of bio-derived polyethylene terephthalate, bio-derived polypropylene, bio-derived polyethylene, and renewable nylon, preferably bio-derived polypropylene.

Contents of the Container

The contents of the container 40 to be dispensed from the foam pump dispenser 1 may be a consumer product, alternatively a cleaning composition to be applied on a surface of interest. The contents of the container 40 may be a liquid or a gel; and may be a cleaning composition in a form of a hair shampoo, a hair conditioner composition, a liquid detergent composition, a fabric care composition or a fabric softener, a shower or bath cream, a body wash or foaming body wash, or a liquid hand soap or foaming liquid hand soap.

Preferably, the surface of interest may be hair when the composition is a personal cleansing composition in the form of a hair shampoo, or a hair conditioner; alternatively skin when the personal cleansing composition is in the form of a personal care product such as a shower or bath cream, a body wash or foaming body wash; alternatively fabrics when the cleaning composition is in the form of a consumer product such as a liquid detergent or a fabric softener. Most preferably the surface of interest may be skin.

The product forms contemplated for purposes of defining the cleansing compositions are rinse-off formulations by which it is meant that the product is applied topically to the skin or hair and then subsequently (i.e., within minutes) rinsed away with water, or otherwise wiped off using a substrate or other suitable removal means.

Alternatively, the contents of the container 40 may be a leave-on product like, for example, a hand sanitizer, a facial moisturizer, or a body lotion.

The contents of the container 40 may be alternatively a body lotion. The body lotion typically has an aqueous and oily phases, an emulsifier to prevent separation of the two aqueous and oily phases, and a benefit agent. A suitable benefit agent may be niacinamide.

Alternatively, the contents of the container 40 may be a personal cleansing composition, wherein the personal cleansing composition is chosen from a liquid hand washing composition, a liquid body washing composition, a liquid hair washing composition, or combinations thereof.

The personal cleansing composition such as a body wash, a hand liquid soap or a hair shampoo may comprise a surfactant system, and a benefit agent. For a body wash, a benefit agent may be petrolatum, mineral oil or a vegetable oil, e.g., soybean oil to provide moisturization onto skin.

The personal cleansing composition may be substantially free of alkyl sulfate and/or alkyl ether sulfate type of surfactant. Namely, the personal cleansing composition may comprise less than 1.5%, or less than 1.4%, or less than 1.2%, or less than 1%, or less than 0.8%, or less than 0.5%, or less than 0.3%, or is free of alkyl sulfate and/or alkyl ether sulfate type of surfactant by weight of the composition.

The personal cleansing composition may not comprise any alkyl ether sulfates which are those having the formula:

$$RO(CH_2CH_2O)_nSO_3M$$

wherein R is an alkyl or alkenyl having 8 to 18 carbons, preferably 12 to 18 carbons, n has an average value of greater than at least 0.5, preferably between 2 and 3; and M is a solubilizing cation such as sodium, potassium, ammonium or substituted ammonium.

The personal cleansing composition may not comprise any ammonium and sodium lauryl ether sulfates.

The cleansing composition may be used in the foam pump dispenser 1. The cleansing composition may include one or more components. The one or more components of the cleansing compositions may be used in the container 40 of the foam pump dispenser 1.

The one or more components of the cleansing composition may include a foaming component. The foaming component may be a foaming surfactant such as one or more anionic surfactants, one or more amphoteric surfactants, and/or one or more nonionic surfactants.

Suitable anionic surfactants may include alkylbenzene sulfonates, alkyl or alkenyl ether sulfates, alkyl or alkenyl sulfates, olefin sulfonates, alkane sulfonates, saturated or unsaturated fatty acid salts, alkyl or alkenyl ether carboxylates, «-sulfonated fatty acid salts, N-acyl amino acid type surfactants, phosphate monoester or diester type surfactants, sulfosuccinates.

Fatty acyl isethionate and fatty acyl sarcosinate are two suitable anionic surfactants for instance.

Fatty Acyl Isethionate

The personal cleansing composition or the foaming component may comprise a fatty acyl isethionate surfactant. The fatty acyl isethionate surfactant may be defined as an isethionate according to the general Formula (I):

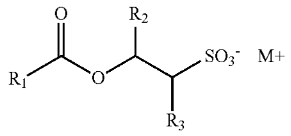

(I)

wherein $R_1$ is a saturated or unsaturated, straight or branched, alkyl or alkenyl chain with from 6 to 30 carbon atoms, preferably from 8 to 22 carbon atoms, more preferably from 9 to 18 carbon atoms, $R_2$ and $R_3$ are each independently H or $(C_1$-$C_4)$ alkyl, and $M^+$ is an alkali metal, preferably lithium, sodium, potassium; or $M^+$ is an alkali-earth metal, preferably magnesium; or $M^+$ is an ammonium or a substituted ammonium cation.

Preferably, $R_1$ may be a saturated or unsaturated, straight or branched alkyl or alkenyl, preferably an alkyl chain with from 6 to 30 carbon atoms, preferably from 8 to 22 carbon atoms, more preferably from 9 to 18 carbon atoms, $R_2$ and $R_3$ are H, and $M^+$ is an alkali metal, preferably sodium, potassium; or $M^+$ is an ammonium cation.

More preferably, $R_1$ may be a saturated or unsaturated, straight or branched alkyl chain with from 9 to 18 carbon atoms, $R_2$ and $R_3$ are H, and $M^+$ is sodium or an ammonium cation.

Suitable fatty acyl isethionate surfactants may include the reaction product of fatty acids esterified with isethionic acid and neutralized with sodium hydroxide. Suitable fatty acids for isethionate surfactants can be derived from coconut oil or palm kernel oil, for instance. Additional examples of suitable isethionic anionic surfactants are described in U.S. Pat. Nos. 2,486,921; 2,486,922; and 2,396,278, each of which is incorporated herein by reference.

Alternatively, the personal cleansing composition or the foaming component may comprise a fatty acyl isethionate, wherein a chain length distribution in the acyl isethionate surfactant is such that:

- C8 chain within the chain length distribution is between about 0.01 wt. % to about 3.5 wt. %, preferably between about 0.01 wt. % to about 3.0 wt. %, more preferably between about 0.01 wt. % to about 2.0 wt. %;
- C10 chain within the chain length distribution is between about 0.01 wt. % to about 3.5 wt. %, preferably between about 0.01 wt. % to about 3.0 wt. %, more preferably between about 0.01 wt. % to about 2.0 wt. %;
- C12 chain within the chain length distribution is between about 40 wt. % to about 80 wt. %, preferably between about 45 wt. % to about 77 wt. %, more preferably between about 51 wt. % to about 76 wt. %;

C14 chain within the chain length distribution is between about 10 wt. % to about 25 wt. %, preferably between about 15 wt. % to about 25 wt. %, more preferably between about 18 wt. % to about 22 wt. %;

C16 chain within the chain length distribution is between about 3 wt. % to about 14 wt. %, preferably between about 3 wt. % to about 14 wt. %, more preferably between about 3 wt. % to about 13 wt. %; and C18 chain within the chain length distribution is between about 1 wt. % to about 14 wt. %, preferably between about 1 wt. % to about 10 wt. %, more preferably between about 1 wt. % to about 10 wt. %.

The personal cleansing composition or the foaming component may comprise from 1% to 10% or from 1.75% to 2.75%, preferably from 2.0% to 2.5%, more preferably from 2.25% to 2.5%, most preferably from 2.35% to 2.5%, of a fatty acyl isethionate surfactant by weight of the composition. The concentrations mentioned here are total concentration ranges in case more than one fatty acyl isethionate surfactant is present. The specified ranges are provided by weight and relate to the total weight of the personal cleansing composition.

The fatty acyl isethionate surfactant may be chosen from sodium lauroyl isethionate, sodium lauroyl methyl isethionate, sodium oleoyl isethionate, sodium oleoyl methyl isethionate, sodium stearoyl isethionate, sodium stearoyl methyl isethionate, sodium myristoyl isethionate, sodium myristoyl methyl isethionate, sodium palmitoyl isethionate, sodium palmitoyl methyl isethionate, sodium cocoyl isethionate, sodium cocoyl methyl isethionate, a blend of stearic acid and sodium cocoyl isethionate, ammonium cocoyl isethionate, ammonium cocoyl methyl isethionate, or mixtures thereof.

The fatty acyl isethionate surfactant may be preferably chosen from sodium lauroyl isethionate, sodium myristoyl isethionate, sodium palmitoyl isethionate, sodium stearoyl isethionate, sodium oleoyl isethionate, sodium cocoyl isethionate, ammonium cocoyl isethionate, or mixtures thereof.

The fatty acyl isethionate surfactant may be more preferably chosen from sodium lauroyl isethionate, sodium cocoyl isethionate, ammonium cocoyl isethionate, or mixtures thereof.

The fatty acyl isethionate surfactant may be even more preferably chosen from sodium cocoyl isethionate, ammonium cocoyl isethionate, or mixtures thereof.

The fatty acyl isethionate surfactant may most preferably comprise sodium cocoyl isethionate.

In that aspect, the personal cleansing composition or the foaming component may comprise from 1.75% to 2.75%, preferably from 2.0% to 2.5%, more preferably from 2.25% to 2.5%, most preferably from 2.35% to 2.5%, of sodium cocoyl isethionate by weight of the composition.

Corresponding commercial products are available, for example, from the company Innospec under the trade name "Iselux®" and from Clariant or Uniquema under the trade names "Hostapon®" or "Arlatone®." Examples of other commercial fatty acyl isethionates that may be used can be Hostapon® surfactants from Clariant such as for sodium cocoyl isethionate: Hostapon® SCI-85C, Hostapon® SCI-78C, or a blend of stearic acid with sodium cocoyl isethionate: Hostapon® SCI-65C. Examples of other commercial fatty acyl isethionates that may be used can be "Jordapon®" surfactants from BASF such as Jordapon® CI prill or Jordapon® CI65; and sodium cocoyl isethionate from Yongan Daily Chemical Co. such as YA-SCI-85® or YA-SCI-65®.

Fatty acyl isethionates surfactants are typically prepared by the reaction of an isethionate salt such as metal or ammonium isethionate and an a saturated or unsaturated, straight or branched, alkyl or alkenyl chain fatty acid having from 6 to 30 carbon atoms, preferably from 8 to 22 carbon atoms, more preferably from 6 to 18 carbon atoms. Depending on the processing conditions used, the resulting fatty acyl isethionate surfactant can be a mixture of 45 to 95% by weight of fatty acyl isethionates and 0 to 40 wt. % of free fatty acids, in addition to isethionates salts, typically less than 5 wt. %, and trace (less than 2 wt. %) of other impurities, by total weight of the resulting fatty acyl isethionate surfactant. A mixture of aliphatic fatty acids may be used for the preparation of commercial fatty acyl isethionates surfactants.

Fatty Acyl Sarcosinate

The personal cleansing composition or the foaming component may further comprise from 1% to 10% or from 1.75% to 3.0%, preferably from 2.0% to 2.5%, more preferably from 2.25% to 2.5%, most preferably from 2.35% to 2.5%, of a fatty acyl sarcosinate surfactant by weight of the composition.

The fatty acyl sarcosinate surfactant may be a sarcosinate according to the general Formula (II):

(II)

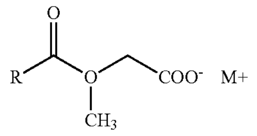

wherein R is a saturated or unsaturated, straight or branched or alkenyl, preferably alkyl chain with 7 to 17 carbon atoms, preferably with 9 to 13 carbon atoms and $M^+$ is H, a sodium, potassium or ammonium cation.

The fatty acyl sarcosinate may be chosen from sodium lauroyl sarcosinate, sodium cocoyl sarcosinate, sodium myristoyl sarcosinate, TEA-cocoyl sarcosinate, ammonium cocoyl sarcosinate, ammonium lauroyl sarcosinate, dimer dilinoleyl bis-lauroyl glutamate/lauroyl sarcosinate, lauroyl sarcosinate, isopropyl lauroyl sarcosinate, potassium cocoyl sarcosinate, potassium lauroyl sarcosinate, sodium oleoyl sarcosinate, sodium palmitoyl sarcosinate, TEA-lauroyl sarcosinate, TEA-oleoyl sarcosinate, TEA-palm kernel sarcosinate, or mixtures thereof. For instance, TEA-cocoyl sarcosinate is the triethanolamine salt of cocoyl sarcosine.

Preferably, the fatty acyl sarcosinate may be chosen from sodium lauroyl sarcosinate, sodium myristoyl sarcosinate, sodium cocoyl sarcosinate, or mixtures thereof.

The fatty acyl sarcosinate may most preferably comprise sodium lauroyl sarcosinate.

In that aspect, the personal cleansing composition or the foaming component may comprise from 1.75% to 3.0%, preferably from 2.0% to 2.5%, more preferably from 2.25% to 2.5%, most preferably from 2.35% to 2.5%, of sodium lauroyl sarcosinate by weight of the composition. The cleansing composition may comprise sodium lauroyl sarcosinate in addition to the isethionate surfactant as mentioned hereinbefore.

Anionic Surfactant not being a Fatty Acyl Isethionate or a Fatty Acyl Sarcosinate The personal cleansing composition or the foaming component may comprise one or more anionic surfactants not being a fatty acyl isethionate or a fatty acyl sarcosinate.

The personal cleansing composition or the foaming component may comprise from 0.5% to 25%, preferably from 1% to 20%, more preferably from 5% to 15% of the one or more anionic surfactants not being a fatty acyl isethionate or a fatty acyl sarcosinate by weight of the composition.

The one or more anionic surfactants not being a fatty acyl isethionate or a fatty acyl sarcosinate may be chosen from sulfosuccinates, sulfonates, sulfoacetates, acyl glycinates, acyl alaninates, acyl glutamates, lactates, lactylates, taurates, or mixtures thereof.

Non-limiting examples of sulfosuccinate surfactants can include disodium N-octadecyl sulfosuccinate, disodium lauryl sulfosuccinate, diammonium lauryl sulfosuccinate, sodium lauryl sulfosuccinate, disodium laureth sulfosuccinate, tetrasodium N-(1,2-dicarboxyethyl)-N-octadecyl sulfosuccinnate, diamyl ester of sodium sulfosuccinic acid, dihexyl ester of sodium sulfosuccinic acid, dioctyl esters of sodium sulfosuccinic acid, and combinations thereof.

Non-limiting examples of sulfonates can include alpha olefin sulfonates, linear alkylbenzene sulfonates, sodium laurylglucosides hydroxypropylsulfonate, and combinations thereof.

Non-limiting examples of sulfoacetates can include sodium lauryl sulfoacetate, ammonium lauryl sulfoacetate, and combination thereof.

Non-limiting examples of acyl glycinates can include sodium cocoyl glycinate, sodium lauroyl glycinate, and combination thereof.

Non-limiting example of acyl alaninates can include sodium cocoyl alaninate, sodium lauroyl alaninate, sodium N-dodecanoyl-1-alaninate, and combinations thereof.

Non-limiting examples of acyl glutamates can be chosen from sodium cocoyl glutamate, disodium cocoyl glutamate, ammonium cocoyl glutamate, diammonium cocoyl glutamate, sodium lauroyl glutamate, disodium lauroyl glutamate, sodium cocoyl hydrolyzed wheat protein glutamate, disodium cocoyl hydrolyzed wheat protein glutamate, potassium cocoyl glutamate, dipotassium cocoyl glutamate, potassium lauroyl glutamate, dipotassium lauroyl glutamate, potassium cocoyl hydrolyzed wheat protein glutamate, dipotassium cocoyl hydrolyzed wheat protein glutamate, sodium capryloyl glutamate, disodium capryloyl glutamate, potassium capryloyl glutamate, dipotassium capryloyl glutamate, sodium undecylenoyl glutamate, disodium undecylenoyl glutamate, potassium undecylenoyl glutamate, dipotassium undecylenoyl glutamate, disodium hydrogenated tallow glutamate, sodium stearoyl glutamate, disodium stearoyl glutamate, potassium stearoyl glutamate, dipotassium stearoyl glutamate, sodium myristoyl glutamate, disodium myristoyl glutamate, potassium myristoyl glutamate, dipotassium myristoyl glutamate, sodium cocoyl/hydrogenated tallow glutamate, sodium cocoyl/palmoyl/sunfloweroyl glutamate, sodium hydrogenated tallowoyl glutamate, sodium olivoyl glutamate, disodium olivoyl glutamate, sodium palmoyl glutamate, disodium palmoyl glutamate, TEA-cocoyl glutamate, TEA-hydrogenated tallowoyl glutamate, TEA-lauroyl glutamate, or mixtures thereof.

Non-limiting example of lactates can include sodium lactate.

Non-limiting examples of lactylates can include sodium lauroyl lactylate, sodium cocoyl lactylate, and combination thereof.

Non-limiting examples of acyl taurates can include sodium methyl cocoyl taurate, sodium methyl lauroyl taurate, sodium methyl oleoyl taurate, and combinations thereof.

In that case, alkyl is defined as a saturated or unsaturated, straight or branched alkyl chain with 6 to 30 carbon atoms, preferably with 8 to 22 carbon atoms, more preferably with 9 to 18 carbon atoms. In that case, acyl is defined as of formula R—C(O)—, wherein R is a saturated or unsaturated, straight or branched alkyl or alkenyl, preferably alkyl chain with 6 to 30 carbon atoms, preferably with 8 to 22 carbon atoms, more preferably with 9 to 18 carbon atoms.

Zwitterionic Surfactant

The personal cleansing composition or the foaming component may comprise from 1% to 15% or from 7.75% to 9.75%, preferably from 8.0% to 9.5%, more preferably from 8.75% to 9.5%, most preferably from 9.0% to 9.25% of a zwitterionic surfactant by weight of composition, wherein the zwitterionic surfactant comprises a betaine.

The zwitterionic surfactant may comprise an alkyl betaine or an alkyl amidopropyl betaine; or a sulfobetaine.

Examples of betaine zwitterionic surfactants may include coco dimethyl carboxymethyl betaine, cocoamidopropyl betaine (CAPB), coco-betaine, lauryl amidopropyl betaine (LAPB), oleyl betaine, lauryl dimethyl carboxymethyl betaine, lauryl dimethyl alpha-carboxyethyl betaine, cetyl dimethyl carboxymethyl betaine, lauryl bis-(2-hydroxyethyl) carboxymethyl betaine, stearyl bis-(2-hydroxypropyl) carboxymethyl betaine, oleyl dimethyl gamma-carboxypropyl betaine, lauryl bis-(2-hydroxypropyl) alpha-carboxyethyl betaine, and mixtures thereof.

Examples of sulfobetaines may include coco dimethyl sulfopropyl betaine, stearyl dimethyl sulfopropyl betaine, lauryl dimethyl sulfoethyl betaine, lauryl bis-(2-hydroxyethyl) sulfopropyl betaine and mixtures thereof.

More preferably, the zwitterionic surfactant may be chosen from cocamidopropyl betaine, lauramidopropyl betaine, coco betaine, or mixtures thereof.

The personal cleansing composition or the foaming component may comprise from 7.75% to 9.75%, preferably from 8.0% to 9.5%, more preferably from 8.75% to 9.5%, most preferably from 9.0% to 9.25% of cocamidopropyl betaine.

Additional Co-Surfactant

The personal cleansing composition or the foaming component may include an additional co-surfactant, wherein the additional co-surfactant comprises an amphoteric surfactant. Suitable amphoteric surfactants can include those described in U.S. Pat. Nos. 5,104,646 and 5,106,609, each of which is incorporated herein by reference.

Amphoteric surfactants can include those that can be broadly described as derivatives of aliphatic secondary and tertiary amines in which an aliphatic radical can be straight or branched chain and wherein an aliphatic substituent can contain from 8 to 18 carbon atoms such that one carbon atom can contain an anionic water solubilizing group, e.g., carboxy, sulfonate, phosphate, or phosphonate. Examples of compounds falling within this definition can be sodium 3-dodecyl-aminopropionate, sodium 3-dodecylaminopropane sulfonate, N-alkyltaurines such as the one prepared by reacting dodecylamine with sodium isethionate according to the teaching of U.S. Pat. No. 2,658,072, N-higher alkyl aspartic acids such as those produced according to the teaching of U.S. Pat. No. 2,438,091, and products described in U.S. Pat. No. 2,528,378, each of which is incorporated herein by reference.

The amphoteric surfactant included in the personal cleansing composition described herein may be preferably chosen from sodium lauroamphoacetate, sodium cocoamphoacetate, disodium lauroamphoacetate, disodium cocodiamphoacetate, or mixtures thereof.

Suitable nonionic surfactants may include polyethers, glycoside derivatives, ethoxylated oils and fats, alkyl alcohol amides.

Other Contents of the Container

Alternatively, the contents of the container 40 may be a hair shampoo, wherein the hair shampoo comprises a cationic polymer such a cationic guar polymer, conditioning agents (including hydrocarbon oils, fatty esters, silicones), anti-dandruff actives, and chelating agents. Additional suitable optional ingredients include but are not limited to particles, anti-microbials, foam boosters, anti-static agents, moisturizing agents, propellants, self-foaming agents, pearlescent agents, opacifiers, sensates, suspending agents, solvents, diluents, anti-oxidants, vitamins, and mixtures thereof.

Conditioning agents (including hydrocarbon oils, fatty esters, silicones), anti-dandruff actives, or sensitive ingredients may be included in the contents of the container 40.

The cationic polymer may be chosen from Polyquaternium-6, Polyquaternium-10, cationic guars, or mixtures thereof.

Alternatively, the contents of the container 40 may be a hair conditioner composition, wherein the hair conditioner composition comprises:

(a) a cationic surfactant, a high melting point fatty compound; a silicone compound; and (b) a carrier.

Cationic surfactants may be those having a longer alkyl group, i.e., $C_{18}$-$C_{22}$ alkyl group, for example, behenyl trimethyl ammonium chloride, methyl sulfate or ethyl sulfate, and stearyl trimethyl ammonium chloride, methyl sulfate or ethyl sulfate.

Alternatively, cationic surfactants may be tertiary amidoamines having an alkyl group of from 12 to 22 carbon atoms, preferably from 16 to 22 carbon atoms. Exemplary tertiary amido amines include: stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylamine, behenamidoethyldiethylamine, behenamidoethyldimethylamine, arachidamidopropyldimethylamine, arachidamidopropyldiethylamine, arachidamidoethyldiethylamine, arachidamidoethyldimethylamine, diethylaminoethylstearamide. Useful amines are disclosed in U.S. Pat. No. 4,275,055, Nachtigal, et al.

Alternatively, the cationic surfactants may include dialkyl cationic surfactants, for example, dialkyl (14-18) dimethyl ammonium chloride, ditallow alkyl dimethyl ammonium chloride, dihydrogenated tallow alkyl dimethyl ammonium chloride, distearyl dimethyl ammonium chloride, or dicetyl dimethyl ammonium chloride.

The high melting point fatty compound as used herein is a fatty compound having a melting point of 25° C. or higher, preferably 40° C. or higher, more preferably 50° C. or higher. The high melting point fatty compound may be chosen from fatty alcohols, fatty acids, fatty alcohol derivatives, fatty acid derivatives, or mixtures thereof.

Typical fatty alcohols may be chosen from pure cetyl alcohol, stearyl alcohol, behenyl alcohol, or mixtures thereof.

Silicone compounds useful herein may also include amino substituted materials. Preferred aminosilicones may include, for example, those which conform to the general formula (I):

$$(R_1)_aG_{3-a}\text{-Si}—(—OSiG_2)_n\text{-}(—OSiG_b(R_1)_{2-b})_m—O—SiG_{3-a}(R_1)_a$$

wherein G is hydrogen, phenyl, hydroxy, or C1-C8 alkyl, preferably methyl; a is 0 or an integer having a value from 1 to 3, preferably 1; b is 0, 1 or 2, preferably 1; n is a number from 0 to 1,999; m is an integer from 0 to 1,999; the sum of n and m is a number from 1 to 2,000; a and m are not both 0; $R_1$ is a monovalent radical conforming to the general formula $CqH_{2q}L$, wherein q is an integer having a value from 2 to 8 and L is selected from the following groups: $—N(R_2)CH_2—CH_2—N(R_2)_2$; $—N(R_2)_2$; $—N(R_2)_3A^-$; $—N(R_2)CH_2—CH_2—NR_2H_2A^-$; wherein $R_2$ is hydrogen, phenyl, benzyl, or a saturated hydrocarbon radical, preferably an alkyl radical from $C_1$ to $C_{20}$; $A^-$ is a halide ion.

Alternatively, the contents of the container 40 may be a liquid detergent composition, wherein the liquid detergent composition comprises any surfactant as set out above and comprise at least one active chosen from: amphiphilic alkoxylated polyalkyleneimine, cyclic polyamine or oligoamine, salt, hydrotrope, organic solvent, and mixtures thereof.

Test Methods

It is understood that the Test Methods that are disclosed in the Test Methods Section of the present application should be used to determine the respective values of the parameters of Applicants' invention as such invention is described and claimed herein.

Foam Flowability Test Method

The Foam Flowability Test Method ("FFTM") is herein described to determine the speed of movement of foam at the tilt angle of 75 degrees on a polyurethane bio-skin (Size: 195 mm*130 mm*5 mm (Thickness); Model: Hardness 2LV, Texture Normal) from Ohken Co., Ltd, Japan (reported as mm/s).

Bio-skin is positioned on a homemade tilt HDPE plate, the plate angle is fixed at 75 degrees.

The nozzle or the actuator outlet of a foam pump dispenser is placed 2 mm away from artificial skin to precisely pump out a foam on the bio-skin surface.

1.2 ml or 1.5 ml of the foam as determined by pump engine is dispensed out within 1 second onto the tilt bio-skin. The bio-skin is tilt before positioning the foam.

The time when the foam traversed 180 mm distance on bio-skin is measured to nearest distance 1 mm. The flowability is defined as the speed calculated by dividing 180 mm by the time with unit mm/second.

All measurements are performed in a laboratory maintained at 23° C.±2° C. and 50%+2% relative humidity and test samples are conditioned in this environment for 4 hours prior to testing.

Maximal Pump Pressing Force Test Method

The Maximal Pump Pressing Force Test Method ("MPPFTM") is herein described to determine the maximum pressing force of a foam pump assembly with pressing velocity at 25 mm/s. (reported as N).

A foam pump assembly as recited herein is assembled with a container which is filled with a foaming composition being assessed to the level to be seen in the final foam pump dispenser. The foam pump assembly is secured to the container. For this, the closure of the foam pump assembly is coupled to the neck of the container.

The pressing force is measured by INSTRON Model 8500 Testing system.

The foam pump assembly is actuated five times at a 90% full stroke at 25 mm/sec head speed. The real-time pressing force accuracy of 0.1 Newtons is measured by mechanical sensor of INSTRON Model 8500. The pressing force is determined as the maximal pressing force measured by mechanical sensor with unit Newton.

Cone/Plate Viscosity Measurement

The viscosity of a composition is measured by a Cone/Plate Brookfield DV12T, by Brookfield Engineering Laboratories, Stoughton, MA. The cone used (Spindle CPA-41z) has a diameter of 24 mm and 3° angle. The viscosity is determined using a steady state flow experiment at constant shear rate of 2 $s^{-1}$ and at temperature of 26.5° C. The sample size is 2.5 mL.

EXPERIMENTAL

Hereinafter, the foam attributes have been characterized in terms of the results of foam flowability, foam appearance, and maximum pump pressing force. Two identical foaming personal cleansing compositions have been evaluated. The only difference between the two compositions was the viscosity. The viscosity of the foaming personal cleansing composition was adjusted at 5 cps (5 mPa·s) or 34 cps (34 mPa·s) by adjusting the inorganic salt level in composition.

TABLE 1

| Test leg 1: Composition ("liquid") with a viscosity of 5 cps (5 mPa · s) | | | |
|---|---|---|---|
| | Dosage: 1.2 mL Air-liquid ratio: 10:1 A cylinder having two mesh nets with the respective mesh numbers: 150 mesh + 250 mesh | Dosage: 1.5 mL Air-liquid ratio: 7:1 A cylinder having two mesh nets with the respective mesh numbers: 150 mesh + 250 mesh | Dosage: 1.5 mL Air-liquid ratio: 7:1 6 interlocking mesh elements each having one single mesh net with a mesh number of: 100 mesh |
| Foam Flowability | 58 s | 33 s | 56.8 s |
| Foam appearance | | Slightly watery (FIG. 11A) | Fine foam (FIG. 11B) |
| Maximal Pump Pressing force | 30.3N | 29.30N | 29.79N |

Figure 11A:
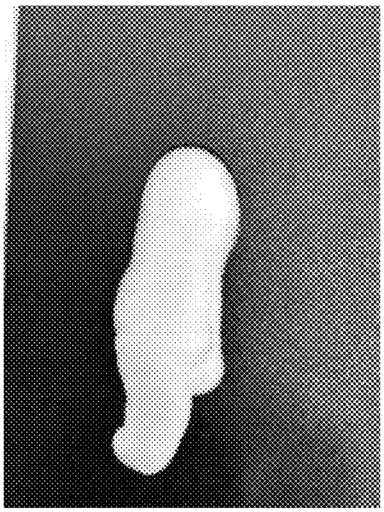
FIG. 11A and FIG. 11B provide two images of foams obtained respectively either with a comparative foam pump assembly or a foam pump assembly as described herein dispensing a composition with a viscosity of 5 cps (5 mPa·s)
Figure 11B:
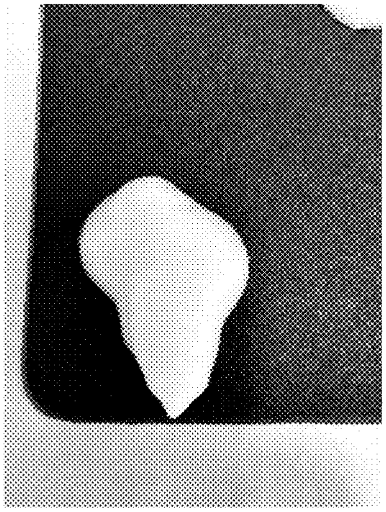

FIG. 11A and FIG. 11B provide two images of foams obtained respectively either with a comparative foam pump assembly or a foam pump assembly as described herein dispensing a composition with a viscosity of 5 cps (5 mPa·s).

When dispensing a relatively low viscosity foaming personal cleansing composition of 5 cps (5 mPa·s), the foam pump assembly comprising 6 interlocking mesh units stacked together could improve the foam flowability of a 1.5 mL pump dosage. The foam pump assembly as recited herein could also maintain the maximal pump pressing force at the same time versus a comparative foam pump assembly including a conventional cylinder comprising two mesh nets.

TABLE 2

| Test leg 1: Composition ("liquid") with a viscosity of 34 cps (34 mPa · s) | | |
|---|---|---|
| | Dosage: 1.5 mL Air- liquid ratio: 7:1 A cylinder having two mesh nets with the respective mesh numbers: 150 mesh + 250 mesh | Dosage: 1.5 mL Air-liquid ratio: 7:1 5 interlocking mesh elements each having one single mesh net with a mesh number of: 50 mesh |
| Foam Flowability | 307 s | 225 s |
| Foam appearance | 5+ obvious large bubbles (FIG. 11C) | No obvious large bubbles—Fine foam (FIG. 11D) |
| Maximal Pump Pressing force | 32.99 N | 29.64 N |

Figure 11C:
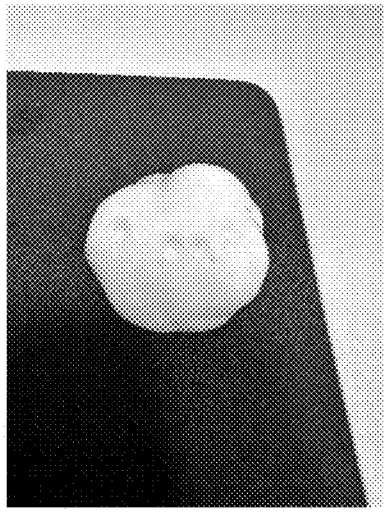
FIG. 11C and FIG. 11D provide two images of foams obtained respectively either with a comparative foam pump assembly or a foam pump assembly as described herein dispensing a composition with a viscosity of 34 cps (34 mPa·s)
Figure 11D:
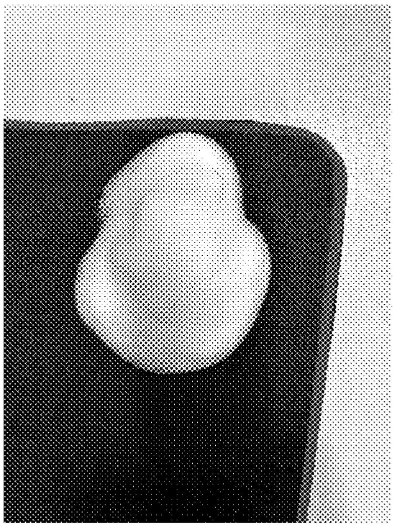

FIG. 11C and FIG. 11D provide two images of foams obtained respectively either with a comparative foam pump assembly or a foam pump assembly as described herein dispensing a composition with a viscosity of 34 cps (34 mPa·s).

When dispensing a relatively high viscosity foaming personal cleansing composition of 34 cps (34 mPa·s), the foam pump assembly comprising 5 interlocking mesh units could improve the foam flowability of a 1.5 mL pump dosage and the foam appearance versus a comparative foam pump assembly including a conventional cylinder comprising two mesh nets. Indeed, the foam appearance (See FIG. 11D) had been improved by reducing the presence of any relatively large bubbles (FIG. 11C), while reducing the maximum pump pressing force at the same time.

In that aspect, the resulting foam may have a foam flowability above 50 s as measured according to the Foam Flowability Test Method. Hence, the foam was not dripping to fast from the user's hand. The foam may further have a pressing force of less than 30 N as measured according to the Maximum Pump Pressing Force Test Method. Hence, the foam to be dispensed was easier to get from the foam pump assembly as set out herein.

Figure 12A:
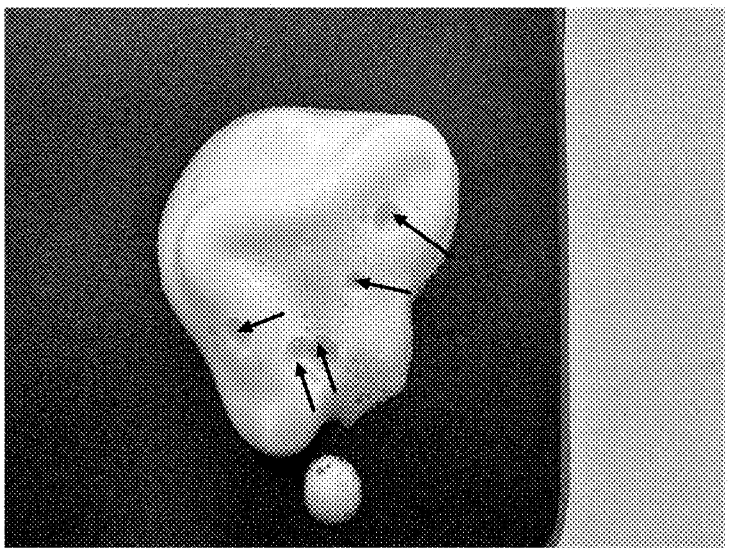
FIG. 12A and FIG. 12B provide two images of foams obtained respectively either with a comparative foam pump assembly or a foam pump assembly as described herein.
Figure 12B:

FIG. 12A and FIG. 12B provide two images of foams obtained respectively either with a comparative foam pump assembly as described hereinafter or a foam pump assembly as described herein.

A comparative foam pump assembly was provided and included above the mixing chamber a conventional cylinder having a first and second mesh nets. The first mesh net had a mesh number of 150 mesh. The second mesh net had a mesh number of 250 mesh. Also, the outlet of the nozzle portion of the actuator also included a third mesh net having a mesh number of 200 mesh. See for instance US 2022/0008943 A1 for an example.

The foam pump assembly that had been assessed had 6 interlocking mesh elements each having one single mesh net with a mesh number of 100 mesh. The pump dosage used was 1.5 mL and the air-liquid ratio was 7:1.

Typically, foam pump assemblies included a cylinder comprising a first and second mesh nets. Depending on the dimensions of the mesh pore size of the mesh net, when the mesh pore size is relatively small, acceptable foam creaminess can be obtained for relatively low viscosity compositions below 10 cps (10 mPa·s).

However, when dispensing relatively high viscosity compositions, the mesh pore size needs to be increases. When the mesh pore size increases, bubble size also increases and no foam creaminess can be obtained, especially for relatively high pump dosage with air-liquid ratio of 7:1.

In FIG. 12A, the Comparative Example used 3 mesh nets with relatively higher mesh numbers (150 mesh+250 mesh+200 mesh). However, when dispensing a relatively high viscosity composition of 30 cps (30 mPa·s), obvious large bubbles have been observed. Observation under microscope revealed large bubbles with average size of about 800 μm. The large bubbles make the consumer feel the foam is not creamy, which impacts consumer delight.

When the foam pump assembly had instead a foaming unit comprising 6 interlocking mesh elements stacked together, wherein each mesh element included one single mesh net having a lower mesh number of 100 mesh, a fine and homogeneous foam without any obvious large bubbles could be obtained (see FIG. 12B). Observation under microscope revealed a narrower distribution of bubbles with average sizes from 40 μm to 200 μm, which can drive better consumer delight.

The foam pump assembly as set out herein can help to improve the foam quality especially for relatively high viscous compositions and high pump dosage.

Hence, the foam pump dispenser and the foam pump assembly as set out herein allows dispensing relatively higher viscous compositions around 30-40 cps (30-40 mPa·s) to lead to a fine and creamy foam.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A foam pump dispenser for providing a flowable and fine foam comprising:

a container comprising a neck having a neck landing zone;

a foam pump assembly comprising:

an actuator having a cavity therein;

a closure connected to the actuator and coupled to the neck of the container so that the foam pump assembly is detachably attached to the container;

a pump body having a large diameter cylindrical portion and a small diameter cylindrical portion, wherein the large diameter cylindrical portion is integrally formed with the small diameter cylindrical portion;

a dip tube extending from the pump body, wherein the dip tube is in fluid communication with the container;

wherein the foam pump assembly comprises an air piston sealing the large diameter cylindrical portion of the pump body and forming an air chamber;

wherein the foam pump assembly comprises a liquid piston including an inner piston rod;

wherein the small diameter cylindrical portion of the pump body includes an inlet one-way valve and a plug, wherein the plug prevents the inlet one-way valve for escaping, and wherein the plug supports a coiled spring and the inner piston rod such that the liquid piston and the small diameter cylindrical portion of the pump body forms a liquid chamber;

wherein the foam pump assembly comprises a mixing chamber above the inner piston rod, wherein the contents from the container and air are mixed to lead to a rough foam, characterized in that the foam pump assembly further includes a foaming unit comprising a plurality of interlocking mesh elements, wherein the foaming unit comprises at least 3 interlocking mesh elements each having one single mesh net, wherein the at least 3 interlocking mesh elements are stacked together to produce from the rough foam, a flowable and fine foam.

2. The foam pump dispenser of claim 1, wherein each mesh element includes a side wall, wherein the side wall has an upper portion and a lower portion, wherein the upper portion of the mesh element is integrally formed with the lower portion of the mesh element.

3. The foam pump dispenser of claim 2, wherein the side wall of the mesh element is a ring or a square.

4. The foam pump dispenser of claim 1, wherein the side wall of the mesh element includes a ring, wherein the upper portion of the mesh element has a diameter greater than a diameter of the lower portion of the mesh element.

5. The foam pump dispenser of any one of claim 2, wherein each mesh element comprises two engagement ribs vertically disposed on an inner surface of the large diameter portion of the side wall of the mesh element; wherein each mesh element comprises two engagement recesses vertically disposed on an outer surface of the small diameter portion of the side wall of the mesh element, such that the two engagement ribs of a first mesh unit can interlock with the corresponding engagement recesses of second mesh unit when the first and second mesh units are stacked together.

6. The foam pump dispenser of claim 5, wherein the two engagement ribs of a mesh unit are diametrically opposed to each other.

7. The foam pump dispenser of claim 5, wherein the two engagement recesses of a mesh unit are diametrically opposed to each other.

8. The foam pump dispenser of claim 2, wherein each mesh element comprises a circular engagement rib vertically disposed on an inner surface of the large diameter portion of the side wall of the mesh element; wherein each mesh element comprises a circular engagement recess vertically disposed on an outer surface of the small diameter portion of the side wall of the mesh element, such that the circular engagement rib of a first mesh unit can interlock with the corresponding circular engagement recess of second mesh unit when the first and second mesh units are stacked together.

9. The foam pump dispenser of claim 1, wherein each mesh element includes the one single mesh net positioned at or adjacent to a bottom of each mesh element.

10. The foam pump dispenser of claim 1, wherein the mesh net is composed of a material, wherein the material is chosen from polyethylene terephthalate, polypropylene, polyethylene, nylon, metal, or combinations thereof.

11. The foam pump dispenser of claim 1, wherein the mesh net comprises a mesh number below or equal to 400 mesh.

12. The foam pump dispenser of claim 1, wherein the foaming unit comprises from about 3 to about 100, interlocking mesh elements.

13. The foam pump dispenser of claim 1, wherein the mesh net has a mesh pore size from about 0.1 μm to about 1000 μm.

14. The foam pump dispenser of claim 1, wherein the mesh unit is composed of a material, wherein the material is chosen from polyethylene terephthalate, polypropylene, polyethylene, nylon, metal, or mixtures thereof.

15. A foam pump assembly comprising:

a pump body having a large diameter cylindrical portion and a small diameter cylindrical portion, wherein the large diameter cylindrical portion is integrally formed with the small diameter cylindrical portion;

a dip tube extending from the pump body, wherein the dip tube is in fluid communication with a container;

wherein the foam pump assembly comprises an air piston sealing the large diameter cylindrical portion of the pump body and forming an air chamber;

wherein the foam pump assembly comprises a liquid piston including an inner piston rod;

wherein the small diameter cylindrical portion of the pump body includes an inlet one-way valve and a plug, wherein the plug prevents the inlet one-way valve for escaping, and wherein the plug supports a coiled spring and the inner piston rod such that the liquid piston and the small diameter cylindrical portion of the pump body forms a liquid chamber;

wherein the foam pump assembly comprises a mixing chamber above the inner piston rod wherein liquid or gel contents and air are mixed to lead to a rough foam, characterized in that the foam pump assembly further includes a foaming unit comprising a plurality of interlocking mesh elements, wherein the foaming unit comprises at least 3 interlocking mesh elements each having one single mesh net, wherein the at least 3 interlocking mesh elements are stacked together to produce from the rough foam, a flowable and fine foam.

* * * * *